United States Patent [19]

Oka et al.

[11] Patent Number: 4,726,988
[45] Date of Patent: Feb. 23, 1988

[54] VERTICAL MAGNETIC RECORDING MEDIUM

[75] Inventors: Tetsuo Oka, Otsu; Kenji Hayashi, Kyoto; Takayoshi Akamatsu; Satoshi Horiuchi, both of Otsu, all of Japan

[73] Assignee: Toray Industries, Inc., Tokyo, Japan

[21] Appl. No.: 713,463

[22] Filed: Mar. 19, 1985

[30] Foreign Application Priority Data

Mar. 22, 1984 [JP] Japan .................. 59-055170
Oct. 15, 1984 [JP] Japan .................. 59-214412

[51] Int. Cl.$^4$ .............................. G11B 10/00
[52] U.S. Cl. ..................... 428/307.3; 428/338; 428/422; 428/694; 428/695; 428/900
[58] Field of Search ............ 428/694, 695, 699, 422, 428/202, 900, 307.3, 338; 427/129, 128, 132

[56] References Cited

U.S. PATENT DOCUMENTS

| | | | |
|---|---|---|---|
| 4,239,835 | 12/1980 | Iijima et al. | 428/62 |
| 4,327,139 | 4/1982 | Schaefer et al. | 428/422 |
| 4,388,367 | 6/1983 | Chen et al. | 428/900 |
| 4,390,601 | 6/1983 | Ono et al. | 428/522 |
| 4,395,445 | 7/1983 | Gebauer et al. | 428/422 |
| 4,405,677 | 9/1983 | Chen | 428/900 |
| 4,414,271 | 11/1983 | Kitamoto et al. | 428/694 |
| 4,452,857 | 6/1984 | Yamazaki | 428/900 |
| 4,526,833 | 7/1985 | Burguette et al. | 428/422 |
| 4,565,734 | 1/1986 | Arai et al. | 428/695 |
| 4,582,746 | 4/1986 | Shirahata et al. | 428/695 |
| 4,588,656 | 5/1986 | Kitamoto et al. | 428/694 |
| 4,592,948 | 6/1986 | Kohomoto et al. | 428/695 |
| 4,596,735 | 6/1986 | Noguchi et al. | 428/694 |
| 4,621,008 | 11/1986 | Takasagi | 428/900 |

FOREIGN PATENT DOCUMENTS

| | | | |
|---|---|---|---|
| 122030 | 10/1984 | European Pat. Off. | |
| 124708 | 9/1979 | Japan | 428/695 |
| 152517 | 9/1982 | Japan | |

*Primary Examiner*—Ellis P. Robinson
*Assistant Examiner*—William M. Atkinson
*Attorney, Agent, or Firm*—Austin R. Miller

[57] ABSTRACT

A vertical magnetic recording medium comprising a substrate and a magnetic layer formed on the substrate and having a magnetic anisotropy in the direction vertical to the surface of the substrate is described. The magnetic layer is composed substantially of a metal selected from cobalt and/or iron, and an oxide of the metal. The metal and metal oxide consist of columnar structures oriented in the direction vertical to the surface of the substrate and spaced from one another through fine voids throughout the magnetic layer. The columnar structures have a diameter of 100 to 1000 Å and the magnetic layer have a void ratio of to 56%. The vertical magnetic recording medium is prepared by a process for vacuum-depositing a metal selected from cobalt and iron to form a magnetic layer on a substrate, wherein an oxygen gas and at least one gas chemically inactive in the vacuum deposition system, which is selected from nitrogen, argon, helium, neon, xenon, radon, methane and ethane, are introduced into the vacuum to an extent such that the pressure in the vicinity of the substrate is $1 \times 10^{-3}$ to $5 \times 10^{-2}$ Torr.

12 Claims, 12 Drawing Figures

VERTICAL MAGNETIC RECORDING MEDIUM

BACKGROUND OF THE INVENTION (1) Field of the Invention

The present invention relates to a vertical magnetic recording medium and a process for the preparation thereof. More specifically, it relates to a vertical magnetic recording medium comprising a substrate and a magnetic layer formed thereon, said magnetic layer consisting of columnar structures and voids and being composed substantially of a metal selected from cobalt and iron, and an oxide thereof, and a process for preparing this vertical magnetic recording medium by the vacuum deposition method.

(2) Description of the Related Art

A film of a cobalt type alloy such as a Co-Cr alloy has been used as a thin film type vertical magnetic recording medium. This cobalt type alloy film is ordinarily formed by the sputtering method or the electron beam vacuum deposition method. However, formation of a cobalt type alloy thin film by the sputtering method is not suitable for the industrial production because the film-forming speed is low. The electron beam vacuum deposition using cobalt and chromium is defective in that control of the composition of the film is very difficult because cobalt and chromium are greatly different from each other in the melting point and the vapor pressure. Moreover, each of the foregoing conventional processes has a problem such that in order to improve the magnetic characteristics in the vertical direction, the substrate must be heated at a temperature of about 150° to about 300° C. during the formation of a film.

As means for overcoming these disadvantages, there has been proposed a process in which cobalt is used and electron beam deposition is carried out in oxygen-introduced vacuum, whereby there is formed a cobalt type vertical magnetic recording medium having a two-phase mixed state, which includes cobalt particles and non-ferromagnetic cobalt monoxide particles (see Collection of Lectures at 7th Meeting of Japan Applied Magnetism Association, 7aA-9 to 7aA-B, November 1983).

However, this process for forming a vertical magnetic recording medium by electron beam deposition of cobalt in oxygen-introduced vacuum is still not satisfactory in the following points.

Since only an oxygen gas is introduced, an oxygen gas-getting action is caused by a cobalt deposited onto the substrate or the inner wall of the vacuum chamber at the vacuum deposition step, and the pressure of the vacuum chamber is drastically changed. Accordingly, there is no reproducibility in the filmforming conditions or the magnetic characteristics of the magnetic layer. Furthermore, when the magnetic layer is continuously formed on a continuous substrate composed of an organic polymer film, the magnetic characteristics and the thickness of the magnetic layer become uneven in the machine direction of the substrate. Moreover, cracks are readily formed on the surface of the magnetic layer composed of cobalt and cobalt oxide, which is formed on the continuous substrate. These cracks cause bit error and drop-out at the time of high-density recording. Therefore, formation of such cracks should be avoided.

European Patent No. 116,881, which was laid open after the convention priority date of the present application, proposes a process for forming a vertical magnetic recording medium composed mainly of iron oxide by the opposed target sputtering method in which iron or iron oxide is used as the starting material and argon-oxygen gas is introduced or by the vacuum deposition method using an ion gun. Since the magnetic layer formed by this process is composed mainly of iron oxide, the magnetic layer is fragile and poor in the flexibility and is easily worn.

Furthermore, when a tape-like magnetic recording medium is prepared on an industrial scale by forming a magnetic layer continuously on a polymeric substrate, if the sputtering method is adopted, the film-forming speed is still insufficient and the manufacturing cost is increased. Furthermore, when there is adopted a vacuum deposition method in which iron is evaporated while introducing an oxygen ion or activated oxygen, the structure of the apparatus placed in the vacuum chamber becomes complicated and the number of control factors is increased. Therefore, the process is not preferred from the industrial viewpoint.

SUMMARY OF THE INVENTION

It is a primary object of the present invention to provide a vertical magnetic recording medium suitable for high-density recording. More specifically, it provides a vertical magnetic recording medium having a magnetic layer composed of cobalt or iron and an oxide thereof, which has appropriate voids therein and is substantially free from cracks on the surface thereof.

Another object of the present invention is to provide a process for the preparation of a vertical magnetic recording medium in which the productivity is very excellent. More specifically, it provides a process in which a vertical magnetic recording medium is prepared by depositing cobalt or iron and an oxide thereof on a substrate maintained at a relatively low temperature according to the vacuum deposition method.

In accordance with one fundamental aspect of the present invention, there is provided a vertical magnetic recording medium comprising a substrate and a magnetic layer formed on the substrate and having a magnetic anisotropy in the direction vertical to the surface of the substrate, wherein the magnetic layer is composed substantially of a metal selected from cobalt and iron, and an oxide of said metal, said metal and metal oxide consist of columnar structures oriented in the direction vertical to the surface of the substrate and spaced from one another through fine voids throughout the magnetic layer, said columnar structures having a diameter of 100 to 1000 Å and the magnetic layer having a void ratio of 7 to 56%. In accordance with another aspect of the present invention, there is provided a process for the preparation of a vertical magnetic recording medium, which comprises vacuum-depositing a metal selected from cobalt and iron and an oxide thereof on a substrate to form a magnetic layer, wherein an oxygen gas and at least one gas chemically inactive in the vacuum deposition system, which is selected from the group consisting of nitrogen, argon, helium, neon, xenon, radon, methane and ethane, are introduced into the vacuum to an extent such that the pressure in the vicinity of the substrate is $1 \times 10^{-3}$ to $5 \times 10^{-2}$ Torr.

DETAILED DESCRIPTION OF THE PREFERRED EMBODIMENTS

The magnetic layer in the vertical magnetic recording medium of the present invention has columnar structures oriented in the direction vertical to the surface of the substrate, which are spaced from one another through fine voids.

Figure 1:
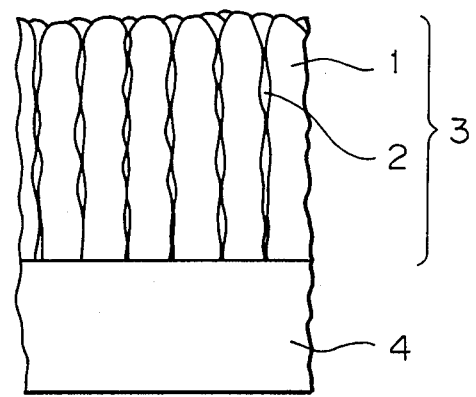
FIG. 1 is an enlarged sectional diagram illustrating an embodiment of the vertical recording medium of the present invention.

The vertical magnetic recording medium of the present invention will now be described with reference to FIG. 1, which illustrates an embodiment of the vertical magnetic recording medium of the present invention. In FIG. 1, reference numerals 1, 2, 3 and 4 represent columnar structures, voids, a magnetic layer and a substrate, respectively. As shown in FIG. 1, the vertical magnetic recording medium of the present invention comprises the substrate 4 and the magnetic layer 3 formed thereon, which consists of columnar structures 1 oriented vertically to the surface of the substrate and spaced from one another through voids 2.

It is preferred that the diameter of the columnar structures be in the range of from 100 Å to 1000 Å. If the diameter exceeds 1000 Å, the coercive force is reduced. If the diameter is smaller than 100 Å, the saturation magnetization and the coercive force are reduced and the magnetic characteristics are degraded.

The columnar structures are composed substantially of a metal selected from cobalt and iron, and an oxide of the metal. As the metal oxide, there can be mentioned $CoO$, $Co_2O_3$, $Co_3O_4$, $FeO$, $\alpha\text{-}Fe_2O_3$, $Fe_3O_4$ and $CoFe_2O_4$.

In the metal and metal oxide consituting the columnar structures, it is preferred that at least one specific crystal axis be oriented vertically to the surface of the substrate, and it is especially preferred that this specific crystal axis be an easily magnetizing axis.

In view of the magnetic characteristics in the vertical direction, it is preferable to use a combination of cobalt and cobalt monoxide (CoO) or a combination of iron and triiron tetraoxide ($Fe_3O_4$). In the case of the combination of cobalt and CoO, the weight ratio of cobalt to CoO is preferably from 80/20 to 20/80, and more preferably from 70/30 to 35/65. In case of the combination of iron and $Fe_3O_4$, in view of the magnetic characteristics in the vertical direction and the abrasion resistance, the weight ratio of iron to $Fe_3O_4$ is preferably from 7/93 to 50/50, and more preferably from 21/79 to 47/53.

It is preferred that fine voids be present among the columnar structures at a void ratio of 7 to 56%. If the void ratio exceeds 56%, the saturation magnetization is reduced and hence, the magnetic characteristics in the vertical direction are reduced, and moreover, the mechanical strength of the magnetic layer is reduced. If the void ratio is lower than 7%, the effect of manifesting the magnetic anisotropy in the vertical direction is insufficient. In order to further enhance the magnetic characteristics in the vertical direction, it is more preferred that the void ratio be in the range from 19 to 52%.

Figure 2:
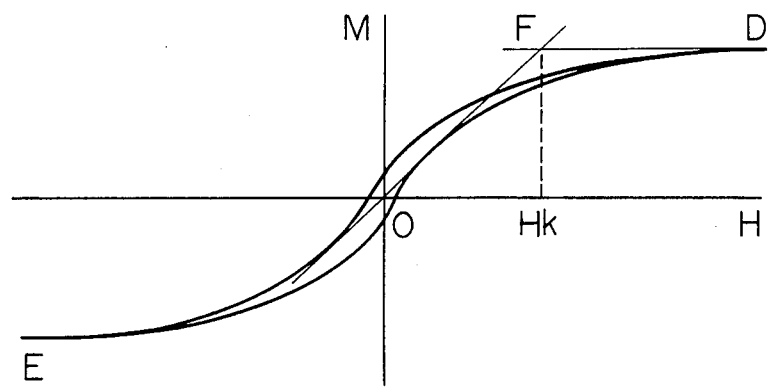
FIG. 2 illustrates a hysteresis loop observed when an external magnetic field is applied to a magnetic layer.

As the parameter indicating the magnetic anisotropy of the vertical magnetic recording medium, there can be mentioned the anisotropic magnetic field (Hk). The larger this value, the more easily magnetized in the vertical direction is the vertical magnetic recording medium. In other words, a vertical magnetic recording medium having a large value of the anisotropic magnetic field is excellent. The method for determining the anisotropic magnetic field (Hk) will now be described with reference to FIG. 2. In FIG. 2, 0 represents the origin, the magnetization intensity (M) of the magnetized magnetic layer is plotted on the ordinate, and the external magnetic field (H) applied to the magnetic layer is plotted on the abscissa. In the hysteresis loop observed when an external magnetic field is applied to a magnetic layer of a sample in parallel to the surface of the magnetic layer, the value of the external magnetic field (H) at the crossing point F between the tangential line drawn to the hysteresis loop from the origin 0 and the line passing through the positive saturation magnetization point D and drawn in parallel to the abscissa of the external magnetic field (H) indicates the anisotropic magnetic field (Hk).

The magnetic layer of the present invention comprises columnar structures composed of a metal selected from cobalt and iron, and an oxide of the metal and fine voids. The thickness of the magnetic layer is not particularly limited, but the thickness if practically in the range of from 0.02 to 5 μm. In view of the flexibility, the head touch and the film-forming speed of the magnetic layer, it is preferred that the thickness of the magnetic layer be in the range of from 0.05 to 2.0 μm.

In the present invention, the void ratio is used as the parameter indicating the ratio of the volume occupied by the voids in the magnetic layer.

The void ratio $\bar{Vo}(\%)$ is expressed by the following formula:

$$\bar{Vo}(\%) = 1 - (dw/dv) \times 100$$

wherein dw represents the weight film thickness and dv represents the geometrical film thickness.

The methods for determining the weight film thickness (dw) and the geometrical film thickness (dv) will be described in detail hereinafter. The weight film thickness (dw) is obtained by measuring the weight of the magnetic layer and dividing the value of the weight by the density of the magnetic layer. The geometrical film thickness (dv) is obtained by directly measuring the thickness of the magnetic layer mechanically by a tracer type surface roughness tester. If there are no voids present such as mentioned above, the weight film thickness (dw) is substantially equal to the geometrical film thickness (dv), and the ratio (dw/dv) of both the values is substantially 1. In other words, the void ratio $\overline{Vo}$ is 0%. In the magnetic layer of the present invention, because of the presence of voids, the weight film thickness (dw) is smaller than the geometrical film thickness (dv), and the ratio (dw/dv) of both the values is lower than 1.

The magnetic layer in the present invention has a magnetic anisotropy in the vertical direction to the surface of the substrate and is suitable for the vertical magnetic recording. A magnetic layer having a magnetic anisotropy in the horizontal direction to the surface of the substrate is not within the scope of the present invention, even if the material and composition are included within the scope of the present invention.

In order to improve the adhesion between the magnetic layer and the substrate in the vertical magnetic recording medium of the present invention and improve the recording and reproducing characteristics or other properties, one or more of undercoating layers may be formed on the substrate. In order to improve the recording and reproducing characteristics, it is more preferred that a soft magnetic layer be formed between the magnetic layer and the substrate. In order to improve the recording and reproducing characteristics by enhancing the mutual action of the head and the magnetic layer, it is preferred that the coercive force of the soft magnetic layer in the horizontal direction to the surface of the substrate is smaller than 35 Oe, more preferably smaller than 20 Oe, most preferably smaller than 10 Oe. The thickness of the soft magnetic layer has a certain range optimum for the mutual action of the head and the magnetic layer. Namely, it is preferred that the thickness of the soft magnetic layer be such that the saturation magnetization per unit area of the soft magnetic layer corresponds to $\frac{1}{4}$ to 10, more preferably $\frac{1}{3}$ to 6, most preferably $\frac{1}{2}$ to 4, of the saturation magnetization per unit area of the magnetic layer.

The soft magnetic layer, composed mainly of iron and nickel, and manganese, molybdenum, chromium or copper may be incorporated so as to reduce the coercive force and increase the permeability. Addition of molybdenum or copper is especially effective and preferred for reducing the coercive force and increasing the permeability. An iron nickel weight ratio approximating to 20/80 or 50/50 is preferred for reducing the coercive force and increasing the permeability.

As the composition comprising additive elements in addition to iron and nickel as the main elements, there are preferably used compositions close to the following weight ratios: 21.2 iron/78.5 nickel/0.3 manganese, 15.7 iron/79.0 nickel/5.0 molybdenum/0.3 manganese, 18.0 iron/75.0 nickel/2.0 chromium/5.0 copper, 17.7 iron/78.5 nickel/3.8 chromium, 16.0 iron/80.0 nickel/4.0 molybdenum and 14.0 iron/77.0 nickel/5.0 copper/4.0 molybdenum.

This soft magnetic layer may be formed according to the vacuum deposition method such as vacuum vapor deposition, ion plating or sputtering, but vacuum vapor deposition is especially preferred because the substrate temperature is not to a high temperature elevated and the film-forming speed is high. The vacuum vapor deposition referred to herein includes electron beam vacuum deposition, induction heating vacuum deposition, resistance heating vacuum deposition and laser heating vacuum deposition.

In the present invention, the kind of the substrate is not particularly limilted. For example, there can be mentioned metals such as aluminum, copper, iron and stainless steel, inorganic materials such as glass and ceramics, and organic polymeric materials such as plastic films. In the case where the processability, moldability and flexibility are important, there are preferably used organic polymeric materials, for example, polyesters such as polyethylene terephthalate, polyethylene naphthalate, polyethylene dicarboxylate and polyethylene-$\alpha,\beta$-bis(2-chlorophenoxy)ethane-4,4-dicarboxylate, polyolefins such as polyethylene, polypropylene and polybutene, polymethyl methacrylate, polycarbonates, polysulfones, polyamides, aromatic polyamides, polyphenylene-sulfide, polyphenylene-oxide, polyamide-imides, polyimides, polyvinyl chloride, polyvinylidene chloride, polytetrafluoroethylene, acetyl cellulose, methyl cellulose, ethyl cellulose, epoxy resins and urethane resins, and mixtures and copolymers thereof. A biaxially oriented film or sheet is especially suitable because the flatness and dimensional stability are excellent, and a biaxially oriented film or sheet of a polyester, polyphenylene-sulfide or aromatic polyamide is especially preferred. The shape of the substrate is not particularly limited, and it may be in the form of a drum, disk, sheet, tape or card. Moreover, the thickness of the substrate is not particularly limited. In the case of a substrate which is in the form of a sheet, tape or card, in view of the processability and dimension stability, it is preferred that the thickness of the substrate be 2 to 500 $\mu$m, more preferably 4 to 200 $\mu$m.

The substrate used in the present invention may be subjected to various surface treatments or preliminary treatments for imparting an easy bondability, an improved flatness, a coloring effect, an antistatic effect and an abrasion resistance to the substrate before the formation of the magnetic layer on the substrate.

A method suitable for preparing the vertical magnetic recording medium of the present invention is a novel reactive vacuum deposition process described in detail hereinafter. As pointed out hereinbefore, this novel process of the present invention is characterized in that a metal selected from cobalt and iron is vacuum-deposited on a substrate to form a magnetic layer, wherein an oxygen gas and at least one gas chemically inactive in the vacuum deposition system, which is selected from the group consisting of nitrogen, argon, helium, neon, xenon, radon, methane and ethane, are introduced into the vacuum to an extent such that the pressure in the vicinity of the substrate is $1 \times 10^{-3}$ to $5 \times 10^{-2}$ Torr.

In the process of the present invention, an oxygen gas and a gas chemically inactive in the vacuum deposition system should be introduced into the vacuum. The effects of the present invention cannot be attained if only one of the two gases is introduced.

By the term "gas chemically inactive in the vacuum deposition system" is meant a gas which is not adsorbed in the magnetic material as the material to be vaporized, or a gas which is adsorbed in the magnetic material only at a very low speed. A gas having a chemical adsorption heat not larger than 10 kcal/mole to iron or cobalt as the material to be vaporized is preferred. For example, there is preferably used at least one gas selected from nitrogen, argon, helium, neon, xenon, radon, methane and ethane. In view of the availability and cost, nitrogen or argon is most preferred when the process is carried out on an industrial scale.

In the vacuum chamber, there is present such a pressure distribution that the pressure is decreased toward the exhaust opening. The pressure in the vacuum chamber is one of important requirements in the process of the present invention. By the term "pressure in the vicinity of the substrate" referred to in the present invention is meant the pressure measured within a linear distance of up to 500 mm from the central point of formation of the magnetic layer on the substrate.

In the process of the present invention, any of resistance heating vacuum deposition, induction heating vacuum deposition, electron beam vacuum deposition, ion plating, ion beam vacuum deposition, laser heating vacuum deposition and arc discharge vacuum deposition may be adopted as the vacuum deposition method. In order to improve magnetic characteristics such as coercive force and anisotropic magnetic field and obtain a high evaporation speed, it is preferable to adopt electron beam vacuum deposition or ion plating. From the industrial viewpoint, electron beam vacuum deposition is most preferred so as to enhance operation adaptability and mass production.

Figure 3:
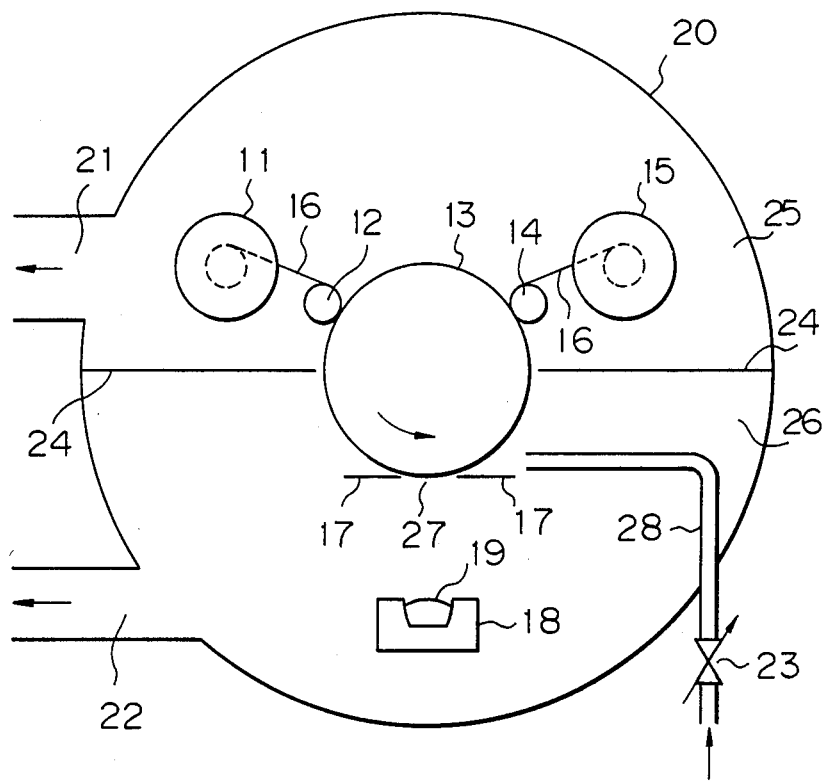
FIG. 3 illustrates an electron beam vacuum deposition apparatus for use in carrying out the process of the present invention.
Figure 4:
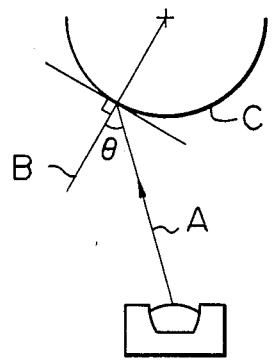
FIG. 4 is a part of the apparatus shown in FIG. 3, for illustrating an incident angle of an evaporant vapor stream.

An embodiment of the preparation process of the present invention will now be described with reference to the accompanying drawings. Referring to FIG. 3 illustrating an example of the electron beam vacuum deposition apparatus for use in carrying out the process of the present invention, a travelling system for a continuous substrate composed of an organic polymer comprises an unwinder 11, a nip roll 12, a main drum 13, a nip roll 14 and a winder 15. The organic polymer substrate 16 is wound in the form of a roll on the unwinder 11. The film 16 is rolled out from the unwinder 11 and passed through the nip roll 12, the main drum 13 and the nip roll 14, and the film 16 is wound on a winding core mounted on the winder 15. The main drum 13 has cooling means (not shown) for cooling the back surface of the organic polymer substrate 16, for example, with circulating cold water. The vacuum chamber 20 is divided into an upper chamber 25 and a lower chamber 26 by a partition wall 24, and the upper and lower chamber 25 and 26 have exhaust openings 21 and 22, respectively. A shielding plate 17 is disposed to restrict the incident angle of a vapor stream formed by evaporation. By the incident angle is meant an angle $\theta$ formed between the evaporant vapor stream A incident on the substrate surface C and the normal line B to the substrate surface C in FIG. 4. An opening 27 is formed on the shielding plate 17 shown in FIG. 3 so that the vapor stream having an incident angle exceeding a predetermined angle of less than 45° is not incident on the substrate surface. Reference numeral 18 represents an electron beam evaporator.

The vertical magnetic recording medium is prepared according to the preparation process of the present invention by using the apparatus having the abovementioned structure. However, the apparatus that can be used in the present invention is not limited to one described above.

A continuous substrate composed of an organic polymeric material, for example, a polyethylene terephthalate film, is placed in the film travelling system of the vacuum deposition apparatus shown in FIG. 3, and in the state where, for example, iron is filled in a concave portion of the electron beam evaporator 18, the vacuum chamber 20 is evacuated through the exhaust openings 21 and 22 until the pressure in the upper chamber 25 is reduced below $5 \times 10^{-4}$ Torr and the pressure in the vicinity of the substrate in the lower chamber 26 is reduced below $5 \times 10^{-5}$ Torr.

A chemically inactive gas and an oxygen gas are introduced from a variable leak valve 23 to the vicinity of the substrate through an introduction pipe 28 so that a predetermined pressure within a range of from $1 \times 10^{-3}$ to $5 \times 10^{-2}$ Torr is produced in the vicinity of the substrate. After this state has been produced, the polyethylene terephthalate film as the substrate is travelled, and for example, iron is melted and evaporated onto the film by electron beam vacuum deposition, whereby a magnetic layer having a magnetic anisotropy in the vertical direction is continuously formed on the substrate.

As pointed out hereinbefore, the oxygen gas and chemically inactive gas are introduced into the vacuum chamber so that the pressure in the vicinity of the substrate is within the range of from $1 \times 10^{-3}$ to $5 \times 10^{-2}$ Torr. If this pressure is too low and outside this range, the anisotropic magnetic field is reduced. If the pressure is too high, the evaporation rate is reduced and the coercive force in the vertical direction is reduced.

In order to improve the magnetic characteristics and obtain a high evaporation rate, it is preferred that the pressure in the vicinity of the substrate be from $2 \times 10^{-3}$ to $2 \times 10^{-2}$ Torr.

It is preferred that the volume ratio of the chemically inactive gas to the oxygen gas be in the range of from 10/90 to 85/15. If the ratio of the oxygen gas exceeds 90% by volume, the oxygen gas undergoes violent getting, and therefore, the pressure in the vicinity of the substrate is changed and no stable magentic characteristics can be obtained. Moreover, cracks are formed on the surface of the formed magnetic layer and the coercive force in the vertical direction and the anisotropic magnetic field are reduced. If the ratio of the oxygen gas is lower than 15% by volume, the coercive force in the vertical direction and the anisotropic magnetic field are degraded and the evaporation rate is reduced.

The partial pressure of the chemically inactive gas may vary depending on the pressure in the vicinity of the substrate and the ratio of the chemically inactive gas to the oxygen gas. However, in order to reduce the oxygen gas-getting and stabilize the magnetic characteristics of the film in the machine direction, it is preferred that the partial pressure of the chemically inactive gas be from $2 \times 10^{-4}$ to $1.5 \times 10^{-2}$ Torr, and in order not to lower the evaporation rate, it is preferred that the partial pressure of the chemically inactive gas be from $4.5 \times 10^{-4}$ to $9 \times 10^{-3}$ Torr.

In order to improve the moisture resistance and abrasion resistance of the magnetic layer, it is preferred that the chemically inactive gas and oxygen gas be introduced from the downstream side relatively to the moving direction of the substrate. For example, as described hereinbefore, in FIG. 3, the chemically inactive gas and oxygen gas are introduced to the vicinity of the substrate from the variable leak valve 23 through the introduction pipe 28.

In order to further improve the moisture resistance and abrasion resistance of the magnetic layer, it is preferred that the oxygen gas be introduced from the downstream side relatively to the moving direction of the substrate, the chemically inactive gas be introduced from the upstream side relatively to the moving direction of the substrate and both the gases be thus supplied to the vicinity of the substrate.

The preparation process utilizing the above-mentioned gas introduction method will now be described with reference to FIG. 5.

Figure 5:
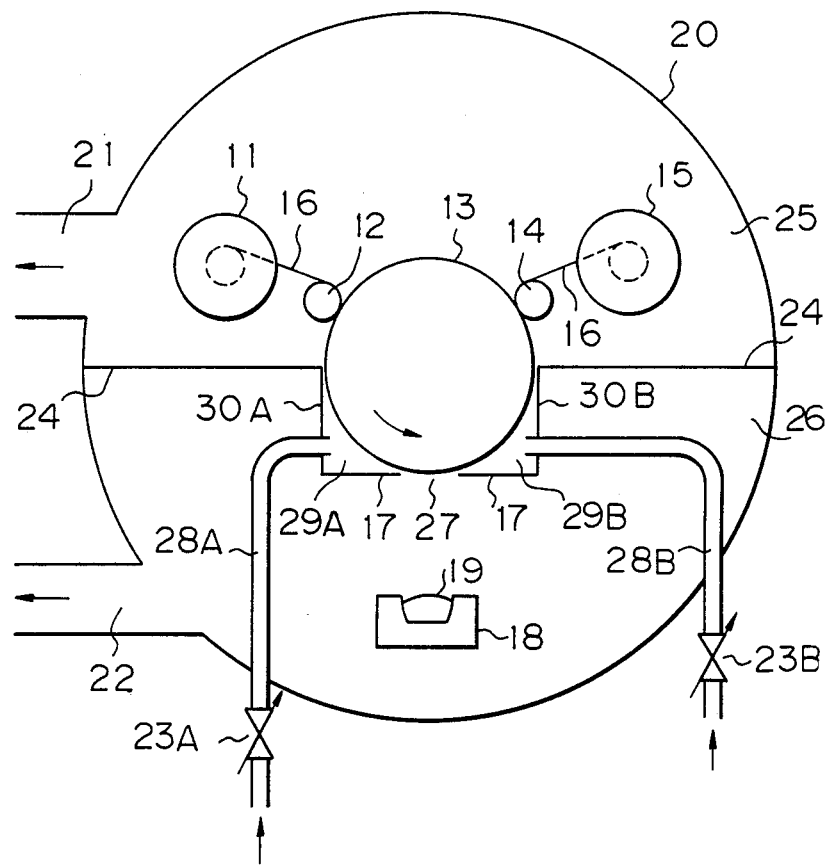
FIG. 5 illustrates an electron beam vacuum deposition apparatus for use in carrying out the process of the present invention.

FIG. 5 illustrates a vacuum deposition system in which gas supply chambers 29A and 29B and gas introduction pipes 28A and 28B are provided within the vacuum deposition apparatus illustrated in FIG. 3.

As shown in FIG. 5, the central portion of a partition wall is bent toward the lower chamber in the vicinity of the drum to form side wall portions 30A and 30B havng a predetermined length. Gas supply chambers 29A and 29B are defined by the side wall portions 30A and 30B, the shielding plate 17 and the lower peripheral surface of the main drum 13. In order to enhance the sealing effect in the gas supply chambers 29A and 29B, it is preferred that the top ends of the central bent portions of the partition wall 24, that is, the top ends of the side wall portions 30A and 30B, be arranged to adhere closely to the surface of the main drum 13, as shown in FIG. 5. It also is preferred that the shielding plate 17 be brought as close to the lower surface of the main drum as possible.

The gases to be introduced into the vacuum atmosphere are passed through gas control valves 23A and 23B and gas supply pipes 28A and 28B and are supplied into gas supply chambers 29A and 29B. The gas control valves 23A and 23B have a function to detect and control the gas flow rate.

A continuous substrate composed of an organic polymeric material, for example, a polyethylene terephthalate film, is placed in the film-travelling system of the vacuum deposition apparatus shown in FIG. 5. In the state where, for example, iron or cobalt is charged in the concave portion of the electron beam evaporator 18, the vacuum chamber 20 is evacuated through the exhaust openings 21 and 22, so that the pressure in the upper chamber 25 is reduced below $5 \times 10^{-4}$ Torr and the pressure in the gas supply chambers 29A and 29B is reduced below $5 \times 10^{-5}$ Torr. Then, the chemically inactive gas is introduced into the gas supply chamber 29A located upstream relatively to the moving direction of the substrate from the gas flow rate control valve 23A through the introduction pipe 28A. Simultaneously, the oxygen gas is introduced into the gas supply chamber 29B located downstream relative to the moving direction of the substrate from the gas flow rate control valve 23B through the introduction pipe 28B. Namely, the chemically inactive gas is supplied to the magnetic layer-forming zone through the gas supply chamber located upstream relative to the moving direction of the substrate. Simultaneously, the oxygen gas is supplied to the magnetic layer-forming zone through the gas supply chamber located downstream relative to the moving direction of the substrate. The pressures in the gas supply chambers 29A and 29B are controlled to predetermined levels by the gas flow rate control valves 23A and 23B. Then, the polyethylene terephthalate film as the substrate is travelled, and iron or cobalt is melted and evaporated on the film by electron beam vacuum evaporation, whereby a magnetic layer having a magnetic anisotropy in the vertical direction is continuously formed on the substrate.

The gas introduced from the downstream side relative to the moving direction of the substrate is a gas containing oxygen, and a mixture comprising oxygen and a chemically inactive gas may be used. It is preferred that the gas is composed mainly of oxygen, and a gas consisting solely of oxygen is most preferred.

Fine projections may be present on the surface of the magnetic layer so as to improve the abrasion resistance of the magnetic layer while maintaining a good head touch without increasing the spacing loss. In order to attain this effect, it is preferred that the height of the fine projections formed on the surface of the magnetic layer be 80 to 500 Å, more preferably 90 to 300 Å, and most preferably 100 to 250 Å. It also is preferred that the density of the fine projections be $10^{10}$ to $10^{12}$ projections per square centimeter, more preferably $4 \times 10$ to $8 \times 10^{11}$ projections per square centimeter, and most preferably $1 \times 10^{11}$ to $5 \times 10^{11}$ projections per square centimeter.

Figure 6:
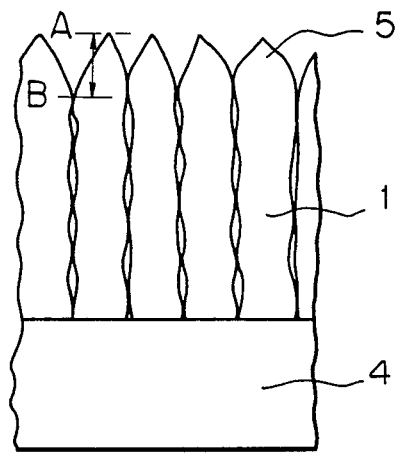
FIG. 6 is an enlarged sectional diagram illustrating another embodiment of the vertical recording medium of the present invention.

The fine projections present on the magnetic layer of the present invention will now be described with reference to the model diagram of FIG. 6, which shows the section of the vertical magnetic recording medium of the present invention in the thickness direction. In FIG. 6, reference numeral 1 represents columnar structures, reference numeral 4 represents the substrate, and projections 5 are formed as the top ends of the columnar structures 1. The height of the projection referred to in the instant specification is expressed by the average value of the height difference between the top portion A and the adjacent trough portion B. The sectional view in the thickness direction is determined by the observation by a transmission electron microscope. The density of the projections can be calculated based on the observation of the surface of the magnetic layer by a scanning type electron microscope or a field emission scanning electron microscope.

In practically using a thin film type vertical magnetic recording medium, it is considered most important to improve the abrasion resistance for preventing wearing and peeling of the magnetic layer. In the case of the magnetic recording medium of the present invention comprising a magnetic layer consisting essentially of a metal selected from cobalt and iron and an oxide of said metal, improvement of the abrasion resistance is practically indispensable.

If there are present fine projections on the surface of the vertical magnetic recording medium, the friction coefficient is reduced because of a decrease of the area of the contact of the medium with a magnetic head or the like, and therefore, the abrasion is moderated. Since the friction coefficient is reduced, the running property of the medium between the magnetic head and tape guide is improved.

As the fine projections are uniformly present at a high density, when the medium is brought into contact with the magnetic head, the load is dispersed and the force imposed on the portation actually falling in contact with the magnetic head is reduced and the abrasion is moderated. Moreover, the medium travels very stably and variations of the reproduction output or noises can be moderated.

As means for forming fine projections on the surface of a magnetic recording medium, there is broadly adopted a method in which fine projections are formed on a substrate such as a plastic film in advance and a magnetic layer is formed on the projections to form projections corresponding to the projection of the substrate on the surface of the resulting medium. However, the magnetic recording medium obtained according to this method is defective in that the magnetic anisotropy in the vertical direction is disturbed by the projections present on the surface of the substrate. For the high-density magnetic recording, it is important that very fine projections be uniformly present at a very high density on the surface of the magnetic layer. However, according to the above-mentioned method forming projections on the surface of the substrate, it is very difficult to simultaneously attain the effect of increasing the density of the projections and enhancing the fineness of the projections.

In the present invention, both the fine projections of the magnetic layer per se and the projections formed from the surface of the substrate are present. However, for the above-mentioned reasons, the proportion of the latter projections is preferably reduced. Since the density of the former projections is high and the former projections have a relatively sharp shape and a large surface area, the lubricating property is increased and the adsorbing property is enhanced, and the abrasion resistance is improved.

If an oxygen gas containing at least 20% by volume of a chemically inactive gas is introduced into the vacuum chamber so that the pressure in the vicinity of the substrate is $1 \times 10^{-3}$ to $5 \times 10^{-2}$ Torr and a metal selected from cobalt and iron is evaporated, fine projections are formed on the surface of the magnetic layer formed on the substrate.

As another means for forming fine projections composed of parts of the magnetic layer on the surface of the magnetic layer, there can be mentioned a method in which the surface of the formed magnetic layer is subjected to sputter etching. Namely, if the magnetic layer is sputtered with an argon gas or the like, the crystal grain boundary portion is selectively etched and fine projections are formed in the remaining portion. Similarly, fine projections can be formed by plasma etching or ion mealing. Of course, the method for forming fine projections is not limited to those mentioned above.

A lubricating layer may be formed on the magnetic layer of the present invention so as to improve the lubrication to the head, the abrasion resistance and the running durability. The thickness of the lubricating layer is 100 to 1000 Å, preferably 100 to 400 Å. If the thickness is smaller than 100 Å, the effect of improving the slip characteristics is insufficient, and if the thickness is larger than 1000 Å, the spacing loss at the time of recording and reproducing is increased because of the thickness and the magnetic recording medium is not suitable for high-density recording.

Since it is required that a good lubricating property be attained by a small thickness as described above of the lubricating layer, a fluorine-containing organic compound is preferably used as the lubricant. Perfluoroalkanes and perfluoroalkyl polyethers are preferred. More specifically, polymeric compounds having a main chain composed of carbon or carbon and oxygen, and the main chain saturated with fluorine or being terminated with fluorine or a polar group are preferably used. For example, homopolymers or copolymers having a main chain composed of recurring units

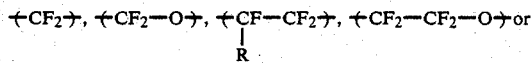

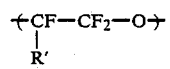

in which R and R' stand for —F, —$C_nF_{2n+1}$ or —O—$C_mF_{2m+1}$, and n and m stand for an integer. As the polar group, there are preferably used —OH, —$NH_2$, —$NO_2$, —CN, ethylene oxide, carboxylic acid, carboxylic acid salt, sulfonic acid and sulfonic acid salt. A carboxylic acid or carboxylic acid salt group is preferred because it shows a high adhesion to the magnetic layer composed of iron or cobalt and an oxide of iron and cobalt. The molecular weight of the fluorine-containing organic compound is preferably 1000 to 10000 and more preferably 2000 to 8000. If the molecular weight is lower than 1000, the lubricating layer is readily peeled. If the molecular weight is higher than 10000, the viscosity becomes too high and attainment of the effect of improving the slip characteristics cannot be expected.

The lubricating layer may be formed directly on the magnetic layer or through a protecting layer. Even if a single lubricating layer is formed, there can be attained effects of improving the slip characteristics, the abrasion resistance and the running durability, but best results are obtained if a laminate structure comprising a layer of a polar group-containing lubricant and a layer of a polar group-free lubricant is used.

The lubricating layer may be formed by any of the bar coating method, the dip coating method, the spin coating method and the vacuum deposition method, though the method for formation of the lubricant layer is not limited to those mentionend above.

When the section of the magnetic layer formed according to the process of the present invention is examined by a transmission electron microscope photograph, it is seen that columnar structures oriented in the vertical direction to the substrate are formed. In the case of a magnetic layer formed according to the conventional process in which only an oxygen gas is introduced, very fine structures extending in the vertical direction to the substrate are observed, but the structure is not so definite as the columnar structures of the magnetic layer prepared according to the process of the present invention.

In the present invention, it is important that a chemically inactive gas such as nitrogen, argon, helium or neon be introduced together with oxygen. Introduction of this chemically inactive gas makes a contribution to elevation of the pressure of the vacuum deposition atmosphere, that is, the pressure in the vicinity of the substrate. Unlike oxygen, the chemically inactive gas does not participate in chemical reaction with the evaporated metal. Therefore, it is considered that substantially all of the introduced chemically inactive gas exerts a function to elevate the pressure in the vacuum deposition atmosphere. It is considered that by elevation of the pressure in the vacuum deposition atmosphere, constituent particles of the formed magnetic layer are appropriately grown and a columnar structure oriented in the vertical direction to the substrate is definitely formed. Simultaneously, fine voids are formed among these columnar structures. The presence of these voids among the columnar structures is an important requirement of the present invention. It is presumed that the voids will exert the following functions.

Since cobalt, iron and $Fe_3O_4$ constituting the columnar structures are magnetic, if they are aggregated and oriented in the vertical direction in the absence of voids, columnar structures are not magnetically insulated from one another and no sufficient magnetic anisotropy in the vertical direction is manifested. On the other hand, in the case of the magnetic layer of the present invention, the columnar structures are magnetically insulated from one another by these voids, where a good magnetic anisotropy in the vertical direction can be manifested. In the case of columnar structures composed of iron and $Fe_3O_4$, the above effect by the voids is prominent. In the case where only an oxygen gas is introduced and it is intended to elevate the pressure, oxidation is excessively advanced in the material to be vacuum-deposited, that is, iron or cobalt, or the particle size of iron, cobalt or an oxide thereof is excessively reduced. Therefore, the saturation magnetization of the formed magnetic layer is abruptly reduced and the magnetic property is substantially weakened. It is considered that the presence of fine voids is effective for relaxing the stress in the magnetic layer, and it is presumed that in the vertical magnetic recording medium of the present invention, formation of cracks is moderated by the presence of fine voids. In the conventional reactive vacuum deposition process in which an oxygen gas is introduced, since the pressure range giving a satisfactory value of the saturation magnetization is not in agreement with the pressure range providing a definite columnar structure, the magnetic characteristics will not be improved. Moreover, in the conventional process, since voids are not sufficiently formed, cracks are formed on the surface of the magnetic layer.

According to the above-mentioned process of the present invention for the preparation of a vertical magnetic recording medium, the following excellent effects are attained.

(1) Since the oxygen gas-getting action is reduced, the magnetic characteristics of a magnetic layer formed continuously on a continuous substrate such an organic polymer film are stable in the machine direction.

(2) Formation of cracks on the formed magnetic layer is reduced.

(3) Values of the coercive force in the vertical direction (Hc ⊥) and the anisotropic magnetic field (Hk) of the obtained magnetic layer are large, and the magnetic characteristics of the obtained magnetic layer are excellent.

(4) A vertical magnetic recording medium excellent in the abrasion resistance can be provided.

(5) Since the vertical magnetic recording medium of the present invention can be formed by the electron beam vacuum deposition method, a sufficient film-forming speed can be obtained. The apparatus is not complicated and the scale-up of the equipment can be easily achieved.

Since the preparation process of the present invention has the above-mentioned merits, for example, a tape-like or disk-like vertical magnetic recording medium can be prepared on an industrial scale by forming a magnetic layer continuously on a substrate of an organic polymer film.

Methods for measuring and evaluating the characteristics will now be described.

(1) Coercive Force, Anisotropic Magnetic Field and Saturation Magnetization

Figure 7:
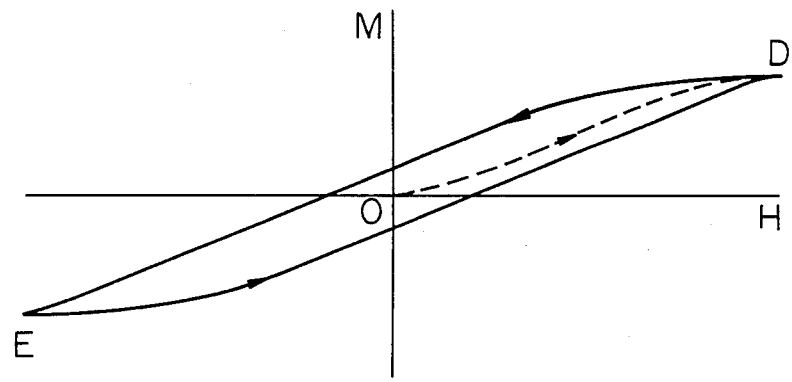
FIG. 7 illustrates a hysteresis loop observed when an external magnetic field is applied to a magnetic layer.

The magnetic characteristics of the magnetic layer can be measured by the vibrating sample type magnetic force meter method shown in JIS C-2561 or the automatic recording magnetic flux meter method. The method for measuring the magentic characteristics by using a vibrating sample magnetometer (Model BHV-30 supplied by Riken Denshi K.K.) will now be described with reference to FIG. 7. In FIG. 7, O represents the origin, the magnetization quantity (M) of the magnetized magnetic layer is plotted on the ordinate, and the external magnetic field (H) applied to the magnetic layer is plotted on the abscissa.

When the external magnetic field (H) is applied to the magnetic layer of an unmagnetized sample in one direction while perpetually increasing the intensity, the magnetization quantity (M) is increased as indicated by a broken line arrow with increase of the external magnetic field (H). If the external magnetic field (H) exceeds a certain level, the magnetization quantity (M) is saturated and is not increased any more even if the external magnetic field (H) is further increased. Point D indicates this point where the magnetization quantity (M) becomes saturated. The magnetization quantity (M) at the point D is called "saturation magnetization (Ms)". If the external magnetic field (H) is reduced from the point D as indicated by a solid line arrow, the magnetization quantity (M) is decreased. Even if the external magnetic field (H) is reduced to zero, the magnetization quantity (M) is not reduced to zero but there is a certain residual magnetization (Mr). If the external magnetic field (H) is further reduced below zero and increased in the negative direction, the magnetization quantity (M) is reduced to zero. The intensity of the external magnetic field (H) at this point is called "coercive force (Hc)". If the external magnetic field (H) is further increased in the negative direction, the magnetization quantity (M) is saturated at a certain value. This value is a negative saturation magnetization (point E in FIG. 7).

When the external magnetic field (H) is applied again in the positive direction from the point E, the magnetization quantity (M) is increased again in the positive direction as indicated by a solid line arrow and the magnetization quantity (M) is increased to O through the point of the negative residual magnetization (—Mr), and is then restored to the original positive saturation magnetizatin point (point D in FIG. 7).

From the thus-obtained hysteresis loop, the coercive force (Hc) is determined. Namely, hysteresis loops obtained when the external magnetic field, applied in the vertical and horizontal directions to the surface of the substrate are recorded by the vibrating sample type magnetic force meter, the coercive force in the vertical direction (Hc⊥) and the corercive force in the horizontal direction (Hc ∥ ) are obtained from these hysteresis loops.

The method for determining the anisotropic magnetic field (Hk) will now be described with reference to FIG. 2. In FIG. 2, O represents the origin, the magnetization quantity (M) of the magnetized magnetic layer is plotted on the ordinate, and the external magnetic field (H) applied to the magnetic layer is plotted on the abscissa. The value of the external magnetic field (H) at the crossing point F between the tangential line drawn to the hysteresis loop from the origin O and the line passing through the positive saturation magnetization point D and drawn in parallel to the abscissa of the external magnetic field (H) indicates the anisotropic magnetic field (Hk).

(2) Analysis of Composition of Magnetic Layer

A. Cobalt and Cobalt Oxide

The measurement is effected in the depth direction of the magnetic layer by X-ray photoelectron spectroscopy and Auger electron spectroscopy using a spectroscopy Model ESCALAB-5 supplied by V. G. Scientific Co.

In the case of X-ray photoelectron spectroscopy, the used radiation source is an Al-K$\alpha$ ray and the output is 10 KV-20 mA. Etching in the depth direction is carried out by the Ar ion etching method.

In the case of Auger electron spectroscopy, the beam voltage is 3 KV, and etching in the depth direction is carried out by the Ar ion etching method.

B. Iron and Iron Oxide

X-ray photoelectron spectroscopy or Auger electron spectroscopy cannot be adopted because metallic Fe is converted to an oxide during the analysis. Accordingly, the analysis of iron and iron oxides is carried out based on the electron diffraction pattern. However, since discrimination between $\gamma$-$Fe_2O_3$ and $Fe_3O_4$ is difficult by the electron diffraction pattern, discrimination of these oxides is carried out by using a laser Raman micro-probe.

The electron diffraction pattern is observed by using a transmission electron microscope (Model H-600 or H-800 supplied by Hitachi K.K.) at an acceleration voltage of 100 KV.

The laser Raman micro-probe used is one supplied under the tradename of "MOLE" by Jovan Ebon Co., and the light source used is Ar laser having a wavelength of 5145 Å.

(3) Quantitative Analysis of Magnetic Layer (A) Cobalt and Cobalt Oxide

The analysis is carried out in the same manner as described above with reference to the analysis of the composition of the magnetic layer.

(B) Iron and Iron Oxide

The quantitative analysis of iron and triiron tetra oxide ($Fe_3O_4$) is carried out by using a $\gamma$-ray electron Mosbauer spectrophotometer. A gas flow type counter (Model BSD-2400 supplied by Austin Science Co.) is used as the detector of the Misbauer spectrophotometer.

(4) Calculation of Weight Thickness of Magnetic Layer

The weight thickness of the magnetic layer is calculated from the weights of the metal and metal oxide obtained in the quantitative anlysis described in (3) above according to the following formula:

$$dw = (dm/\rho m) + (\overline{do}/\overline{\rho o})$$

wherein dw stands for the weight thickness (cm) of the magnetic layer, dm stands for the weight (g/cm$^2$) of the metal per unit area, $\overline{do}$ stands for the weight (g/cm$^2$) of the metal oxide per unit area, $\rho m$ stands for the density (g/cm$^3$) of the metal and $\rho o$ stands for the density (g/cm$^3$) of the metal oxide.

(5) Geometrical Thickness of Magnetic Layer An electrolyte "R-57" (supplied by Densoku Kogyo K.K.) or 1/10N HCl is dropped on a magnetic layer of a magnetic recording medium sample cut out in an appropriate size to remove a part of the magnetic layer and form a step. After water washing and drying, the thickness of the step is measures as the geometrial thickness (dv) of the magnetic layer by using a tracer type surface roughness tester (universal surface configuration measuring device Model "SE-3E" supplied by Kosaka Kenkyusho K.K.).

(6) Observation of Sectional Structure of Magnetic Layer

An ultra-thin slice is cut out from the magnetic recording medium and the sectional structure of the magnetic layer is observed by a transmission electron microscope (Model H-600 or H-800 supplied by Hitachi K.K.) at an acceleration voltage of 100 KV.

(7) Diameter of Columnar Structures and Height of Fine Projections on Surface of Magnetic Layer In the same manner as described in (6) above with reference to the observation of the sectional structure of the magnetic layer, a section of an ultra-fine slice of the magnetic layer is photographed and the diameter of columnar structures is measured from the photograph of the section.

Referring to FIG. 6, the average value of the height difference between the top A of the projection on the surface and the trough B adjacent to this top is designated as the projection height. The projection height is thus determined from a photograph of an ultra-thin slice of the magnetic layer.

(8) Density of Fine Projections on Surface of Magnetic Layer

The density of projections is calcuated from the results of the observation of the surface of the magnetic layer of the magnetic medium by a field emission scanning electron microscope (Model S-800 supplied by Hitachi K.K.).

(9) Pressure in Vicinity of Substrate in Lower Chamber and Pressure in Gas Supply Chamber It is preferred that a pressure-measuring probe be disposed as close to the substrate as possible within a range not disturbing formation of the layer on the surface of the substrate. In the present invention, the pressure-measuring probe is arranged at a point within a linear distance of 500 mm from the center of formation of the magnetic layer. Use of a pressure gauge which is hardly influenced by an oxygen gas, such as a Schultz gauge, a Penning gauge or a diaphram pressure gange is preferred.

(10) Judgement of Presence or Absence of Cracks on Magnetic Layer

The cracking state of the surface of the magnetic layer is examined by a metal microscope ("Optiphot" supplied by Nippon Kogaku Kogyo K.K.) at 80 to 1000 magnifications.

(11) Durability of Magnetic Recording Medium

A specimen having a size of 200 mm×200 mm is cut out from a sample having a magnetic layer formed on one surface of a substrate, and the magnetic layer is coated with a trichlorotrifluoroethylene solution containing 0.5% of a perfluoroalkyl-polyether (having a molecular weight of 6500) containing a terminal carboxylic acid group by the bar coating method and is then dried to form a lubricating layer having a thickness of 400 Å. A floppy disk having a diameter of 5.25 inches is taken out from the specimen and is used as a test sample. The floppy disk is contained in a commercially available floppy disk jacket and is tested by using a floppy disk durability tester (Model SK-429F supplied by Tokyo Engineering K.K.) and a commercially available floppy disk drive (Model JA551 supplied by Matsushita Tsushin Kogyo K.K.).

Recording is performed throughout one track of the sample, and the same track is turned 300 times in the reproducing state and the reproducing output at this time is designated as Ep0,. Then, the same track is further turned 100,000 times, and the reproducing output at this time is designated as Ep10. The ratio of the outputs Ep0 and Ep10 (Ep10/Ep0) is used as a parameter indicating the durability. The closer to 1 is the output ratio Ep10/Ep0, the better the durability. A doubleface type head having a pair of a button type head and gimbal type head is used as the magnetic head, and the head pressure is about 15 g. The rotation number of the floppy disk is 300 rpm.

(12) Moisture Resistance

A sample having a size of 30 mm×30 mm is cut out from a magnetic recording medium and allowed to stand still in an atmosphere having a temperature of 60° C. and a relative humidity of 90% for 10 weeks. The corrosion state of the magnetic layer is evaluated with the naked eye. When discoloration, rusting, blistering or peeling is caused, it is judged that corrosion has taken place. The marks in the column "moisture resistance represent:

A: no corrosion
B: corrosion occurs on less than ½ of the total area of the sample
C: corrosion occurs on ½ or more of the total area of the sample The preparation process of the present invention will now be described in detail with reference to the following examples that by no means limit the scope of the invention.

EXAMPLES 1 THROUGH 6 AND COMPARATIVE EXAMPLES 1 THROUGH 6

The electron beam vacuum deposition apparatus shown in FIG. 3 was evacuated so that the pressure in the upper chamber was reduced below $5\times10^{-4}$ Torr and the pressure in the vicinity of the substrate in the lower chamber was reduced below $1\times10^{-5}$ Torr. A mixed gas of nitrogen and oxygen was introduced into the lower chamber through a variable leak valve, and a biaxially, oriented polyethylene terephthalate film having a thickness of 50 μm was drawn at a predetermined running speed. Iron was melted and evaporated by electron beam evaporation, and a magnetic layer was continuously formed on the film. In the electron beam vacuum deposition apparatus, a shielding plate having an opening such that the incident angle of the vapor stream was smaller than 16° was arranged, and the back surface of the polyethylene terephthalate film was cooled below 50° C. by a cooling drum. An electron beam evaporator Model EGL-110 supplied by Nippon Shinku Gijutsu K.K. was used and a power source Model HP-1610F supplied by Nippon Shinku Gijutsu K.K. was used as the power source for the electron beam evaporator. Electrolytic iron having a purity higher than 99.9% was placed in a concave portion of the electron beam evaporator.

In the above-mentioned preparation process, the mixing ratio of nitrogen and oxygen in the mixed gas and the introduction rate of the mixed gas flow were changed and the pressure in the vicinity of the substrate was changed within the range of from $1\times10^{-3}$ to $5\times10^{-2}$ Torr, and various magnetic layers were prepared (Examples 1 through 4). In the above-mentioned apparatus, a mixed gas of argon and oxygen was introduced and the pressure in the vicinity of the substrate was changed within a range of from $1\times10^{-3}$ to $5\times10^{-2}$ Torr, and magnetic layers were prepared (Examples 5 and 6). In the same apparatus, oxygen alone was introduced as the gas (Comparative Example 1), a 5/95 volume ratio gas mixture of nitrogen and oxygen was introduced (Comparative Example 2), a 90/10 volume ratio gas mixture of nitrogen and oxygen was introduced (Comparative Example 3) and nitrogen alone was used as the gas (Comparative Example 4), and magnetic layers were prepared. In the same apparatus, a 10/90 volume ratio gas mixture of nitrogen and oxygen was introduced and the pressure in the vicinity of the substrate was changed within a range not exceeding $1\times10^{-3}$ Torr, and magnetic layers were formed (Comparative Example 5). Furthermore, a 85/15 volume ratio mixture of argon and oxygen was introduced and the pressure in the vicinity of the substrate was changed within a range exceeding $5\times10^{-2}$ Torr, and magnetic layers were formed (Comparative Example 6). The gases introduced in Examples 1 through 6 and Comparative Examples 1 through 6 and the pressures in the vicinity of the substrate adopted in Examples 1 through 6 and comparative Examples 1 through 6 are shown in Table 1.

The running speed of the polyethylene terephthalate film as the substrate was controlled so that the thickness of the magnetic layer was 2000 to 3000 Å. In each of Examples 1 through 6 and Comparative Examples 1 through 6, the power supplied to the electron beam evaporator was kept constant at 4 Kw.

In each of Examples 1 through 6 and Comparative Examples 1 through 6, an ultra-thin slice of the magnetic layer was photographed under a transmission electron microscope, and the sectional structure was observed. In each of the magnetic layers formed in Examples 1 through 6 and Comparative Examples 4 and 6, definite columnar structures were oriented vertically to the surface of the substrate, and voids were observed among the columnar structures.

In each of the magnetic layers obtained in Comparative Examples 1, 2, 3 and 5, columnar structures were observed but they are indefinite, and the columnar structures were densely aggregated and the number of voids present among the columnar structures was very small.

With respect to each of the magnetic layers obtained in Examples 1 through 6 and Comparative Examples 1 through 6, and composition was analyzed and it was found that the main components were iron and triiron tetraoxide ($Fe_3O_4$) in each magnetic layer.

Figure 8:
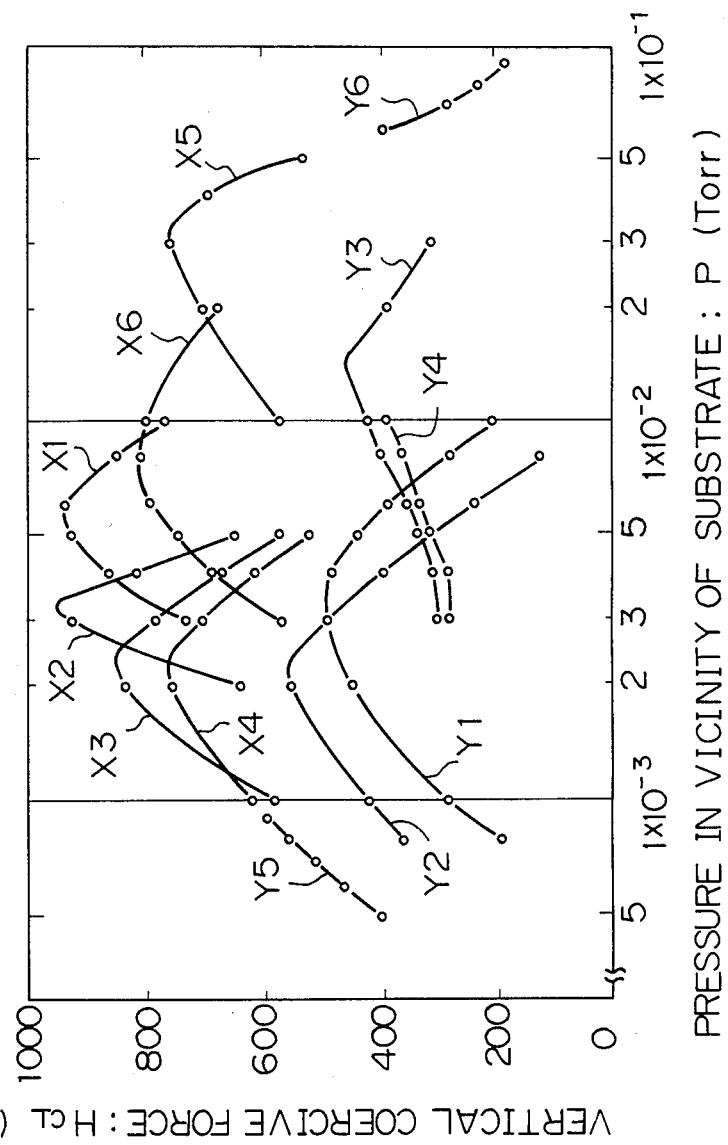
FIG. 8 illustrates relations between the pressure (P) in the vicinity of the substrate and the vertical coercive force (Hc⊥), observed in the working examples.

The relation between the pressure (P) in the vicinity of the substrate and the vertical coercive force ($Hc\perp$) in the vertical direction, observed in Examples 1 through 6 and Comparative Examples 1 through 6, is shown in FIG. 8. The relation between the pressure (P) in the vicinity of the substrate and the anisotropic magnetic field (Hk) is shown in FIG. 9.

Figure 9:
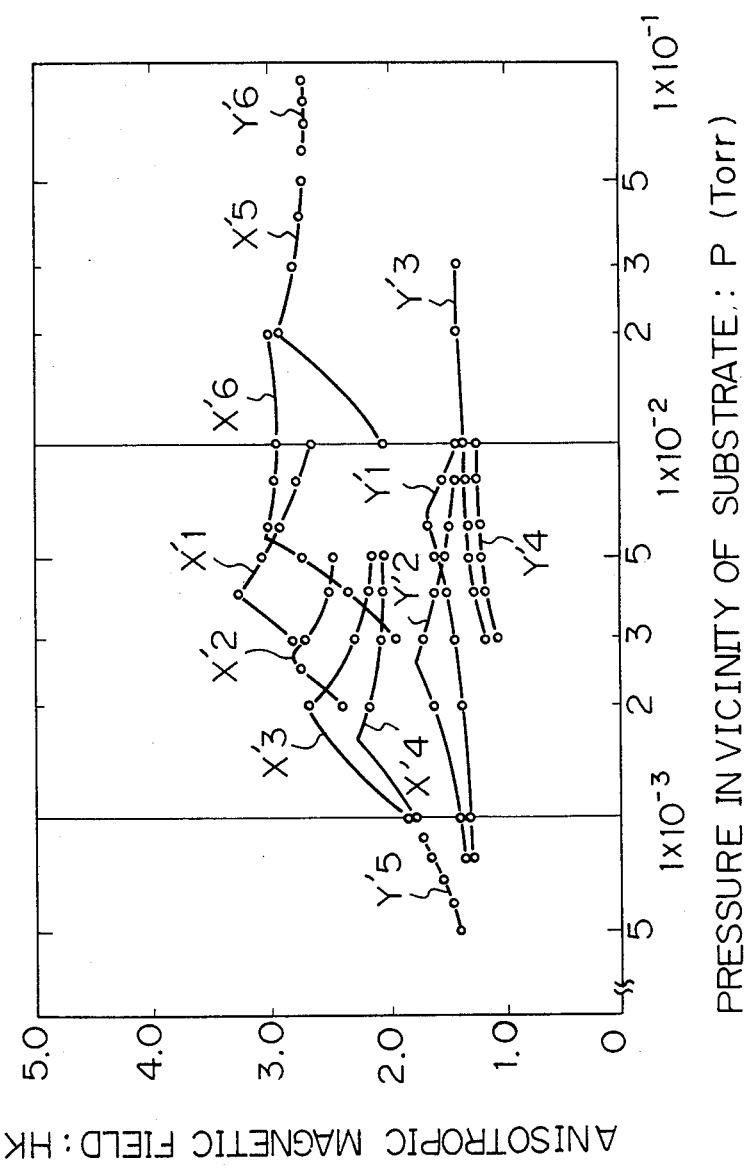
FIG. 9 illustrates relations between the pressure (P) in the vicinity of the substrate and the anisotropic magnetic field (Hk), observed in the working examples.

From the results shown in FIGS. 8 and 9, it is seen that each of the products of Examples 1 through 6 according to the present invention exhibit excellence in both the vertical coercive force and the anisotropic magnetic field, but the products of Comparative Examples 1, 3 and 4 are slightly inferior in the vertical coercive force and the anisotropic magnetic field, the products of Comparative Examples 2 and 5 are poor in the anisotropic magnetic field and the product of Comparative Example 6 is poor in the vertical coercive force. In Comparative Examples 3, 4 and 6, the evaporation speed was low.

With respect to typical instances of Examples 1, 4 and 5 and Comparative Examples 1, 2 and 5, the introduced gas, the composition of the introduced gas, the pressure in the vicinity of the substrate, the diameter of columnar structures, the void ratio in the magnetic layer, the ratio of iron and triiron tetraoxide ($Fe_3O_4$) in the columnar structures and the presence or absence of cracks in the magnetic layer are shown in Table 2.

As shown in Table 2, no cracks were present on the surface of the magnetic layer in the products of Examples 1, 4 and 5 which were prepared by introducing the specified inactive gas-oxygen mixture to an extent such that the pressure in the vicinity of the substrate was in the range specified in the present invention. In contrast, cracks were present on the surface of the magnetic layer in the product of Comparative Example 1 which was prepared by introducing only oxygen gas. Accordingly, the product of Comparative Example was of almost no practical use as a vertical magnetic recording medium for high-density recording.

Furthermore, the vertical magnetic recording medium of the present invention has a magnetic layer, which is composed of columnar structures having an appropriate diameter and an appropriate iron-iron oxide ratio and which has voids among the columnar structures. Therefore, the magnetic characteristics of the vertical magnetic recording medium are excellent as shown in FIGS. 8 and 9.

stream was smaller than 16° was arranged, and the back surface of the polyethylene terephthalate film was cooled below 50° C. by a cooling drum. Cobalt having a purity higher than 99.9% was placed in the concave portion of the electron beam evaporator.

In the above-mentioned preparation process, the mixing ratio of nitrogen and oxygen in the mixed gas and the introduction rate of the mixed gas flow were changed and the pressure in the vicinity of the substrate was changed within the range of from $1 \times 10^{-3}$ to $1.5 \times 10^{-2}$ Torr, and various magnetic layers were prepared (Examples 7 through 9). In the same apparatus, oxygen alone was introduced as the gas (Comparative Example 7) and nitrogen alone was used as the gas (Comparative Example 8), and magnetic layers were prepared.

The gases introduced in Examples 7 through 9 and Comparative Examples 7 and 8 and the pressures in the

TABLE 1

|  | Symbol in FIG. 8 | Symbol in FIG. 9 | Introduced gas and composition (vol. %) | Range of pressure in vicinity of substrate (Torr) |
|---|---|---|---|---|
| Example 1 | X1 | X'1 | $N_2/O_2 = 79/21$ | $3 \times 10^{-3} \sim 1 \times 10^{-2}$ |
| Example 2 | X2 | X'2 | $N_2/O_2 = 55/45$ | $2 \times 10^{-3} \sim 5 \times 10^{-3}$ |
| Example 3 | X3 | X'3 | $N_2/O_2 = 30/70$ | $1 \times 10^{-3} \sim 5 \times 10^{-3}$ |
| Example 4 | X4 | X'4 | $N_2/O_2 = 10/90$ | $1 \times 10^{-3} \sim 5 \times 10^{-3}$ |
| Example 5 | X5 | X'5 | $Ar/O_2 = 85/15$ | $1 \times 10^{-2} \sim 5 \times 10^{-2}$ |
| Example 6 | X6 | X'6 | $Ar/O_2 = 70/30$ | $3 \times 10^{-3} \sim 2 \times 10^{-2}$ |
| Comparative Example 1 | Y1 | Y'1 | $O_2 = 100$ | $8 \times 10^{-4} \sim 1 \times 10^{-2}$ |
| Comparative Example 2 | Y2 | Y'2 | $N_2/O_2 = 5/95$ | $8 \times 10^{-4} \sim 8 \times 10^{-3}$ |
| Comparative Example 3 | Y3 | Y'3 | $N_2/O_2 = 90/10$ | $3 \times 10^{-3} \sim 3 \times 10^{-2}$ |
| Comparative Example 4 | Y4 | Y'4 | $N_2 = 100$ | $3 \times 10^{-3} \sim 1 \times 10^{-2}$ |
| Comparative Example 5 | Y5 | Y'5 | $N_2/O_2 = 10/90$ | $5 \times 10^{-4} \sim 9 \times 10^{-4}$ |
| Comparative Example 6 | Y6 | Y'6 | $Ar/O_2 = 85/15$ | $6 \times 10^{-2} \sim 9 \times 10^{-2}$ |

TABLE 2

|  | Composition (vol. %) of introduced gas | Pressure (Torr) in vicinity of substrate | Diameter (Å) of columnar structures | Void ratio (%) | Fe/Fe$_3$O$_4$ (weight ratio) | Cracks |
|---|---|---|---|---|---|---|
| Example 1 | $N_2/O_2 = 79/21$ | $3.0 \times 10^{-3}$ | 200 | 14 | 41.4/58.6 | Absent |
|  |  | $5.0 \times 10^{-3}$ | 220 | 18 | 34.5/65.5 | Absent |
|  |  | $8.0 \times 10^{-3}$ | 250 | 26 | 27.2/72.8 | Absent |
|  |  | $1.0 \times 10^{-2}$ | 300 | 35 | 18.3/81.7 | Absent |
| Example 4 | $N_2/O_2 = 10/90$ | $2.0 \times 10^{-3}$ | 160 | 14.4 | 44.7/55.3 | Absent |
| Example 5 | $Ar/O_2 = 85/15$ | $1.0 \times 10^{-2}$ | 300 | 45.4 | 29.0/71.0 | Absent |
| Comparative Example 1 | $O_2 = 100$ | $8.0 \times 10^{-4}$ | 50 | 4.7 | 38.0/62.0 | Present |
|  |  | $2.0 \times 10^{-3}$ | 70 | 6.5 | 26.0/74.0 | Present |
|  |  | $4.0 \times 10^{-3}$ | 70 | 4.9 | 16.9/83.1 | Present |

EXAMPLES 7 THROUGH 9 AND COMPARATIVE EXAMPLES 7 and 8

The electron beam vacuum deposition apparatus shown in FIG. 3 was evacuated so that the pressure in the upper chamber was reduced below $5 \times 10^{-4}$ Torr and the pressure in the vicinity of the substrate in the lower chamber was reduced below $1 \times 10^{-5}$ Torr. A mixed gas of nitrogen and oxygen was introduced into the lower chamber through a variable leak valve. A biaxially oriented polyethylene terephthalate film having a thickness of 50 μm was drawn at a predetermined running speed. Cobalt was melted and evaporated by electron beam evaporation, and a magnetic layer was continuously formed on the film. In the electron beam vacuum deposition apparatus, a shielding plate having an opening such that the incident angle of the vapor vicinity of the substrate adopted Examples 7 through 9 and Comparative Examples 7 and 8 are shown in Table 3.

The running speed of the polyethylene terephthalate film as the substrate was controlled so that the thickness of the magnetic layer was 2000 to 3000 Å. In each of Examples 7 through 9 and Comparative Examples 7 and 8, the power supplied to the electron beam evaporator was kept constant at 3.5 Kw.

In each of Examples 7 through 9 and Comparative Examples 7 and 8, an ultra-thin slice of the magnetic layer was photographed under a transmission electron microscope, and the sectional structure was observed. In each of the magnetic layers formed in Examples 7 through 9 and Comparative Example 8, definite columnar structures were oriented vertically to the surface of the substrate, and voids were observed among the columnar structures.

In the magnetic layer obtained in Comparative Example 7 where only oxygen was introduced, columnar structures were observed but they were very fine and indefinite, and the number of voids present among the columnar structures was very small.

With respect to each of the magnetic layers obtained in Examples 7 through 9 and Comparative Examples 7 and 8, the composition was analyzed and it was found that the main components were cobalt and cobalt monoxide in each magnetic layer.

With respect to typical instances of Examples 7 through 9 and Comparative Examples 7 and 8, the introduced gas, the composition of the introduced gas, the pressure in the vicinity of the substrate, the diameter of columnar structures, the void ratio in the magnetic layer, the ratio of cobalt and cobalt monoxide in the columnar structures and the presence or absence of cracks in the magnetic layer are shown in Table 4.

Figure 10:
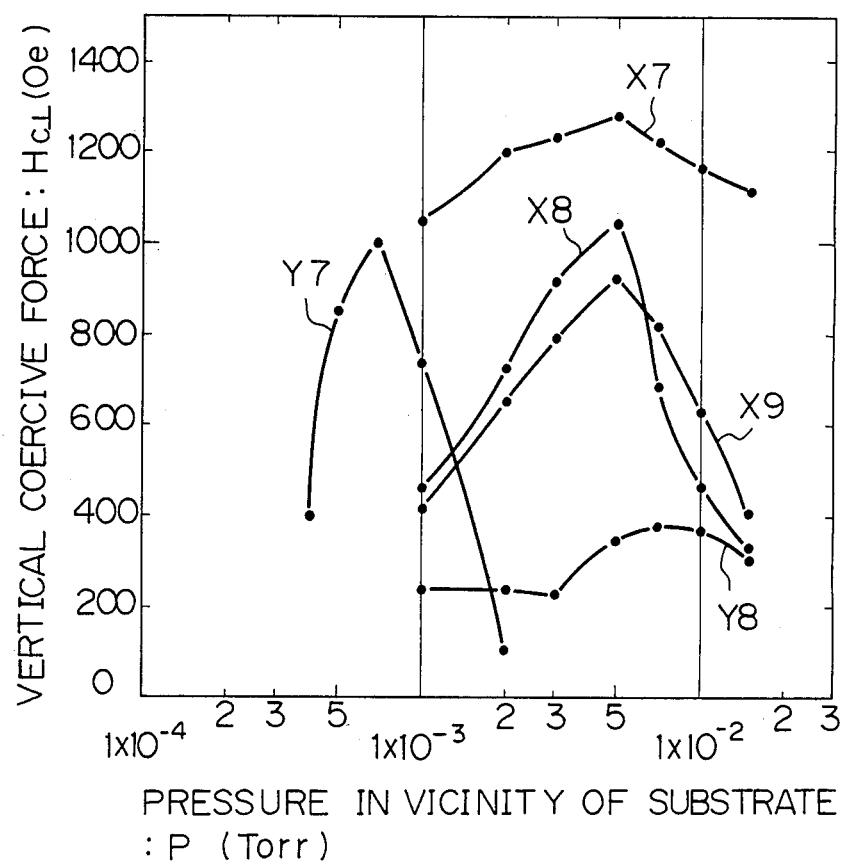
FIG. 10 illustrates relations between the pressure (P) in the vicinity of the substrate and the vertical coercive force (Hc⊥), observed in the working examples.

The relation between the pressure (P) in the vicinity of the substrate and the vertical coercive force ($Hc\perp$), observed in Examples 7 through 9 and Comparative Examples 7 and 8, is shown in FIG. 10. The relation between the pressure (P) in the vicinity of the substrate and the anisotropic magnetic field (Hk) is shown in FIG. 11.

Figure 11:
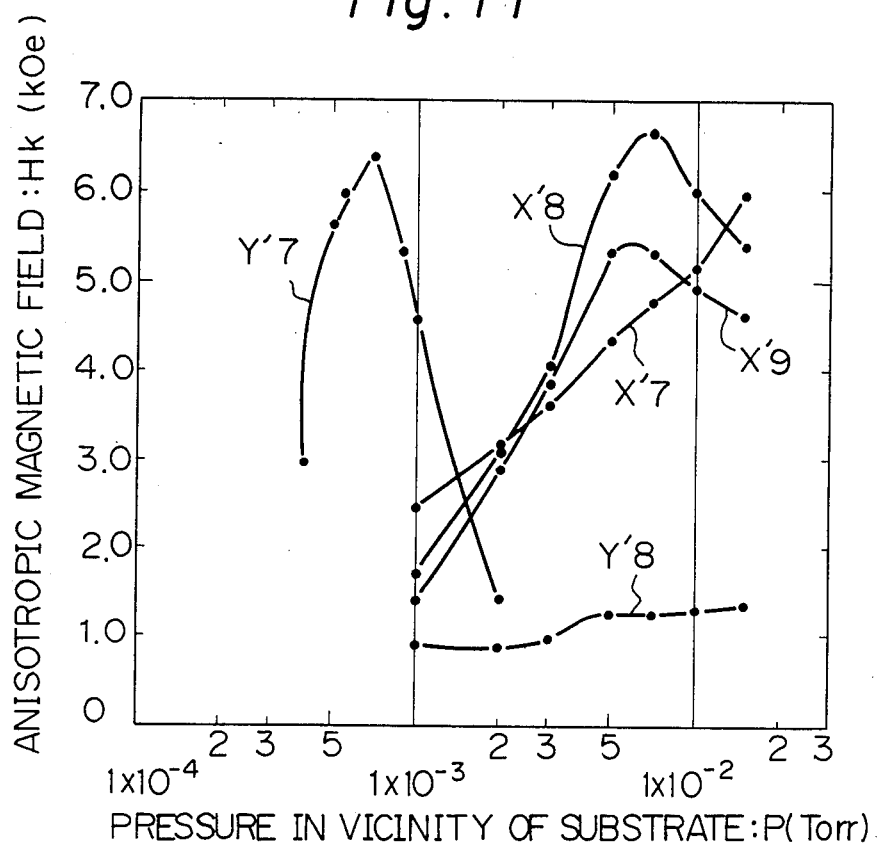
FIG. 11 illustrates relations between the pressure (P) in the vicinity of the substrate and the anisotropic magnetic field (Hk), observed in the working examples.

From the results shown in FIGS. 10 and 11, it is seen that each of the products of Examples 7 through 9 according to the present invention is excellent both in the vertical coercive force and anisotropic magnetic field, but the product of Comparative Example 8 is slightly inferior in the coercive force in the vertical direction and the anisotropic magnetic field. The magnetic characteristics of the product of Comparative Example 7 are not greatly different from those of the products of Examples 7 through 9 according to the present invention. In Comparative Example 7, the variation of the pressure was violent during the formation of the magnetic layer and as shown in Table 4, a great number of cracks in the magnetic layer. Accordingly, the product obtained in Comparative Example 7 was of almost no practical use as a vertical magnetic recording medium for high-density recording.

As shown in Table 4, in the products of Examples 7 through 9 according to the present invention, the diameter of the columnar structures was appropriate and the ratio of cobalt to cobalt monoxide in the columnar structures was appropriate. Furthermore, since there were voids present among the columnar structures, the magnetic characteristics in the vertical direction were excellent and no cracks were present on the surface of the magnetic layer. Accordingly, these products were very excellent as the vertical magnetic recording medium for high-density recording.

TABLE 3

|  | Symbol in FIG. 10 | Symbol in FIG. 11 | Composition (vol. %) of introduced gas | Pressure (Torr) in vicinity of substrate |
|---|---|---|---|---|
| Example 7 | X7 | X'7 | $N_2/O_2 = 79/21$ | $1 \times 10^{-3} \sim 1.5 \times 10^{-2}$ |
| Example 8 | X8 | X'8 | $N_2/O_2 = 55/45$ | $1 \times 10^{-3} \sim 1.5 \times 10^{-2}$ |
| Example 9 | X9 | X'9 | $N_2/O_2 = 30/70$ | $1 \times 10^{-3} \sim 1.5 \times 10^{-2}$ |
| Comparative Example 7 | Y7 | Y'7 | $O_2 = 100$ | $4 \times 10^{-4} \sim 2 \times 10^{-3}$ |
| Comparative Example 8 | Y8 | Y'8 | $N_2 = 100$ | $1 \times 10^{-3} \sim 1.5 \times 10^{-2}$ |

TABLE 4

|  | Composition (vol. %) introduced gas | Pressure (Torr) in vicinity of substrate | Diameter (Å) of columnar structures | Void ratio (%) | Co/CoO (weight ratio) | Cracks |
|---|---|---|---|---|---|---|
| Example 7 | $N_2/O_2 = 79/21$ | $3.0 \times 10^{-3}$ | 200 | 14.5 | 67.6/32.4 | Absent |
|  |  | $5.0 \times 10^{-3}$ | 250 | 18.0 | 56.5/43.5 | Absent |
|  |  | $7.0 \times 10^{-3}$ | 250 | 20.0 | 50.0/50.0 | Absent |
|  |  | $1.0 \times 10^{-2}$ | 320 | 26.5 | 40.5/59.5 | Absent |
|  |  | $1.5 \times 10^{-2}$ | 350 | 32.0 | 31.6/68.4 | Absent |
| Example 8 | $N_2/O_2 = 55/45$ | $2.0 \times 10^{-3}$ | 180 | 8.5 | 67.9/32.1 | Absent |
|  |  | $3.0 \times 10^{-3}$ | 200 | 11.0 | 57.6/42.4 | Absent |
|  |  | $5.0 \times 10^{-3}$ | 200 | 21.0 | 32.0/68.0 | Absent |
| Example 9 | $N_2/O_2 = 30/70$ | $2.0 \times 10^{-3}$ | 160 | 22.0 | 68.8/31.2 | Absent |
|  |  | $3.0 \times 10^{-3}$ | 200 | 27.5 | 60.4/39.6 | Absent |
|  |  | $5.0 \times 10^{-3}$ | 200 | 17.5 | 30.0/70.0 | Absent |
| Comparative Example 7 | $O_2 = 100$ | $4.0 \times 10^{-4}$ | 70 | 4.0 | 65.8/34.2 | Present |
|  |  | $5.0 \times 10^{-4}$ | 70 | 2.4 | 52.0/48.0 | Present |
|  |  | $1.0 \times 10^{-3}$ | 90 | 3.4 | 33.7/66.3 | Present |

EXAMPLES 10 THROUGH 14 AND COMPARATIVE EXAMPLES 9 THROUGH 12

The electron beam vacuum deposition apparatus shown in FIG. 3 was evacuated so that the pressure in the upper chamber was reduced below $5 \times 10^{-4}$ Torr and the pressure in the vicinity of the substrate in the lower chamber was reduced below $1 \times 10^{-5}$ Torr. A mixed gas of nitrogen and oxygen was introduced into the lower chamber through a variable leak valve. A biaxially oriented polyethylene terephthalate film was drawn at a predetermined running speed. Iron or cobalt was melted and evaporated by electron beam evaporation, and a magnetic layer having a length of about 80 m was continuously formed on the film. In the electron beam vacuum deposition apparatus, a sheilding plate having such an opening that the incident angle of the vapor stream was smaller than 26° was arranged, and the back surface of the polyethylene terephthalate film was cooled below 50° C. by a cooling drum.

A mixed gas comprising nitrogen and oxygen at a volume ratio of 79/21 was introduced so that the pressure in the vicinity of the substrate was $4.8 \times 10^{-3}$ Torr, and cobalt was evaporated (Example 10). A mixed gas comprising nitrogen and oxygen at a volume ratio of 55/45 was introduced so that the pressure in the vicinity of the substrate was $3.2 \times 10^{-3}$ Torr, and cobalt was evaporated (Example 11). A mixed gas comprising nitrogen and oxygen at a volume ratio of 30/70 was introduced so that the pressure in the vicinity of the substrate was $2.4 \times 10^{-3}$ Torr, and cobalt was evaporated (Example 12). Furthermore, a mixed gas comprising nitrogen and oxygen at a volume ratio of 79/21 was introduced so that the pressure in the vicinity of the substrate was $4.6 \times 10^{-3}$ Torr, and iron was evaporated (Example 13). A mixed gas comprising nitrogen and oxygen at a volume ratio of 30/70 was introduced so that the pressure in the vicinity of the substrate was $9.0 \times 10^{-3}$, and iron was evaporated (Example 14). Moreover, oxygen alone was introduced so that the pressure in the vicinity of the substrate was $4.3 \times 10^{-3}$ Torr, and cobalt was evaporated (Comparative Example 9). A mixed gas comprising nitrogen and oxygen at a volume ratio of 5/95 was introduced so that the pressure in the vicinity of the substrate was $5.2 \times 10^{-3}$ Torr, and cobalt was evaporated (Comparative Example 10). Oxygen alone was introduced so that the pressure in the vicinity of the substrate was $2.0 \times 10^{-3}$ Torr, and iron was evaporated (Comparative Example 11).

In Comparative Example 12, a vertical magnetic layer composed mainly of iron oxide was formed by magnetron sputtering in the following manner.

Figure 12:
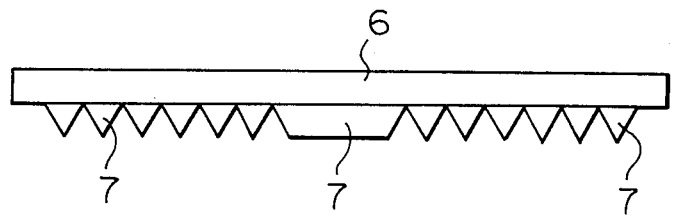
FIG. 12 is a diagram illustrating a target used for sputtering.

A target used for sputtering in Comparative Example 12 is shown in a diagram of FIG. 12. Reference numeral 6 represents a copper disk having a diameter of 6 inches and a thickness of 3 mm, and reference numeral 7 represents a ring of iron having a purity higher than 99.9%, which has a trinagular section. As shown in FIG. 12, the target comprises the iron rings 7 arranged concentrically and attached to the copper disk 6. The above-mentioned iron target was attached to a target holder of a magnetron sputtering apparatus (supplied by Nichiden Anelva K.K.) through a copper disk having a diameter of 6 inches and a thickness of 3 mm. A heating drum is arranged in the apparatus to confront the target, and a winder and an unwinder are arranged before and after the drum.

A vaccum chamber in the above-mentioned apparatus was evacuated until the pressure was reduced below $1 \times 10^{-6}$ Torr. A mixed gas comprising argon and oxygen at a volume ratio of 70/30 was introduced so that the pressure in the vacuum chamber was $4 \times 10^{-3}$ Torr. In this state, a direct current power of about 2.0 Kw was applied. A polyethylene terephthalate film having a thickness of 25 μm was drawn at a speed of about 0.1 m/min. Thus, a magnetic layer was continuously formed on the film. The temperature of the drum was maintained at 80° C.

The main preparation conditions adopted in Examples 10 through 14 and Comparative Examples 9 through 12 are shown in Table 5.

In Examples 10 through 14 according to the present invention, the pressure in the vicinity of the substrate was stable during formation of the magnetic layer and the pressure variation was in the range of from $\pm 1 \times 10^{-4}$ to $\pm 3 \times 10^{-4}$ Torr, and the variation of magnetic properties in the travelling direction of the film was small.

On the other hand, in Comparative Examples 9 through 11, the pressure change was extreme and the variation of the pressure was in the range of from $\pm 5 \times 10^{-4}$ to $\pm 7.5 \times 10^4$ Torr, and the magnetic properties were changed in the travelling direction of the film.

Examples 10 through 14 according to the present invention were advantageous over Comparative Example 12 according to the magnetron sputtering method in that the speed of drawing the substrate was very high and a speed ensuring practical industrial production could be obtained. The travel speed of the substrate could be further increased very easily by increasing the applied electric power.

Ultra-thin slices were cut out from the magnetic layers obtained in Examples 10 through 14 and Comparative Examples 9 through 12 and photographs of the sections were taken. In Examples 10 through 14, definite columnar structures were observed, and fine projections were formed on the top ends of the columnar structures. In Comparative Examples, columnar structures were observed but they were very indefinite. The number of voids was very small, and the columnar structures were densely aggregated. Moreover, the height of the fine projections formed on the top ends of the columnar structures was small and the magnetic layer was relatively flat.

With respect to each of the products obtained in Examples 10 through 14 and Comparative Examples 9 through 12, the vertical coercive force, the anisotropic magnetic field, the height and density of fine projections on the surface of the magnetic layer and the durability test results are shown in Table 6.

The product of each of Examples 10 through 14 was a vertical magnetic recording medium excellent in the magnetic characteristics because both the vertical coercive force and the anisotropic magnetic field were high. Because of the presence of fine projections formed at an appropriate density on the surface of the magnetic layer and having an appropriate height, the durability was very excellent.

On the other hand, in each of the products obtained in Comparative Examples 9 through 12, the height of the fine projections was small or the density was high, and therefore, the durability was poor. Furthermore, the value of the anisotropic magnetic field of the product of Comparative Example 11 was small. Accordingly, none of the products of Comparative Examples 9 through 12 could be practically used as the vertical magnetic recording medium.

TABLE 5

|  | Evaporation method | Substrate thickness (μ) | Evaporated metal | Introduced gas and composition (vol. %) | Pressure (Torr) in vicinity of substrate | Travelling speed (m/min) of substrate | Applied power (KW) |
| --- | --- | --- | --- | --- | --- | --- | --- |
| Example 10 | Electron beam evaporation | 50 | cobalt | $N_2/O_2 = 79/21$ | $4.8 \times 10^3$ | 5.5 | 4.0 |
| Example 11 | Electron beam evaporation | 50 | cobalt | $N_2/O_2 = 55/45$ | $3.2 \times 10^3$ | 5.0 | 4.0 |
| Example 12 | Electron beam evaporation | 50 | cobalt | $N_2/O_2 = 30/70$ | $2.4 \times 10^3$ | 6.0 | 4.0 |
| Example 13 | Electron beam | 50 | iron | $N_2/O_2 = 79/21$ | $4.6 \times 10^3$ | 5.5 | 4.0 |

TABLE 5-continued

|  | Evaporation method | Substrate thickness ($\mu$) | Evaporated metal | Introduced gas and composition (vol. %) | Pressure (Torr) in vicinity of substrate | Travelling speed (m/min) of substrate | Applied power (KW) |
| --- | --- | --- | --- | --- | --- | --- | --- |
|  | evaporation |  |  |  |  |  |  |
| Example 14 | Electron beam evaporation | 50 | iron | $N_2/O_2$ = 30/70 | $9.0 \times 10^3$ | 3.5 | 4.0 |
| Comparative Example 9 | Electron beam evaporation | 50 | cobalt | $O_2$ = 100 | $8.2 \times 10^4$ | 6.5 | 4.0 |
| Comparative Example 10 | Electron beam evaporation | 50 | cobalt | $N_2/O_2$ = 5/95 | $5.2 \times 10^3$ | 5.5 | 4.0 |
| Comparative Example 11 | Electron beam evaporation | 50 | iron | $O_2$ = 100 | $2.0 \times 10^3$ | 5.5 | 4.0 |
| Comparative Example 12 | Magnetron sputtering | 25 | iron | $Ar/O_2$ = 70/30 | $4.0 \times 10$ |  |  |

TABLE 6

|  | Vertical coercive force (Oe) | Anisotropic magnetic field (kOe) | Height (Å) of fine projections on surface of magnetic layer | Number of fine projections per cm$^2$ on surface of magnetic layer | Durability Ep10/Ep0 |
| --- | --- | --- | --- | --- | --- |
| Example 10 | 1280 | 5.8 | 120 | $6 \times 10^{12}$ | 0.95 |
| Example 11 | 1020 | 3.6 | 120 | $4 \times 10^{12}$ | 0.98 |
| Example 12 | 790 | 3.2 | 100 | $3 \times 10^{12}$ | 0.90 |
| Example 13 | 950 | 2.9 | 200 | $5 \times 10^{12}$ | 1.0 |
| Example 14 | 800 | 2.8 | 150 | $1 \times 10^{11}$ | 0.85 |
| Comparative Example 9 | 940 | 5.3 | Below 50 | $8 \times 10^{13}$ | 0.65 |
| Comparative Example 10 | 560 | 2.8 | 50 | $1 \times 10^{12}$ | 0.70 |
| Comparative Example 11 | 460 | 1.2 | Below 50 | $4 \times 10^{13}$ | 0.75 |
| Comparative Example 12 | 800 | 2.6 | Below 50 | $8 \times 10^{13}$ | 0.60 |

EXAMPLES 15 THROUGH 20 AND COMPARATIVE EXAMPLES 13 THROUGH 18

The electron beam vacuum deposition apparatus shown in FIG. 5 was evacuated so that the pressure in the upper chamber was reduced below $5 \times 10^{-4}$ Torr and the pressure in the gas supply chamber was reduced below $5 \times 10^{-5}$ Torr. A chemically inactive gas was introduced on the upstream side relatively in the travel direction of the substrate. Simultaneously, an oxygen-containing gas was introduced on the downstream side relative to the travel direction of the substrate. A biaxially oriented polyethylene terephthalate film having a thickness of 50 $\mu$m was drawn at a predetermined running speed, and cobalt or iron was melted and evaporated by electron beam evaporation and a magnetic layer was continuously formed on the film. In the electron beam vacuum deposition apparatus, a shielding plate having an opening such that the incident angle of the vapor stream smaller than 26° was arranged, and the back surface of the polyethylene terephthalate film was maintained below 50° C. by a cooling drum. An electron beam evaporator Model EGL-110 supplied by Nippon Shinku Gijutsu K.K. was used and a power source Model HP-1610F supplied by Nippon Shinku Gijutsu K.K. was used as the power source for the electron beam evaporator. Cobalt or iron having a purity higher than 99.9% was placed in the concave portion of the electron beam evaporator.

According to the above-mentioned preparation process, magnetic layers were formed by changing the gas introduced on the upstream side relative to the travel direction of the substrate, the gas introduced on the downstream side, the supply ratio of both the gases (flow amount of the gas introduced on the upstream side/the flow amount of the gas introduced on the downstream side) and the gas supply chamber pressure as shown in Table 7 (Examples 15 through 20). In Examples 15 through 20, the gas introduced on the downstream side was oxygen or an oxygen-containing mixed gas.

In the same electron beam vacuum deposition apparatus as used in Examples 15 through 20, magnetic layers were continuously formed on a biaxially oriented polyethylene terephthalate film having a thickness of 50 $\mu$m in the same manner as described in Examples 15 through 20 except that a chamically inactive gas was introduced on the downstream side relative to the travel direction of the substrate or no gas was introduced on the downstream side relative to the travel direction of the substrate (Comparative Examples 13 through 18).

The evaporated metal, the introduced gas, the flow amount ratio and the pressure in the gas supply chamber in Comparative Examples 13 through 18 are shown in Table 7.

The thickness of the magnetic layer was adjusted to 2000 to 3000 Å by controlling the travel speed of the polyethylene terephthalate film as the substrate. In Examples 15 through 20 and Comparative Examples 13 through 18, the electric power applied to the vertical electron beam evaporator was kept constant at 4 Kw.

With respect to each of the magnetic recording media obtained in Examples 15 through 20 and Comparative Examples 13 through 18, the vertical coercive force, the anisotropic magnetic field, the results of the moisture resistance test and the results of the durability test are shown in Table 7.

Since no definite difference was observed in the reproducing output ratio (Ep10/Ep0) after turning was repeated 100,000 times at the above-mentioned durability test, the output (Ep30) was determined after turning was repeated 300,000 times, and the reproducing output ratio (Ep30/Ep0) was calculated. The results are shown in Table 7.

From the results shown in Table 7, it is seen that the vertical magnetic recording media prepared by introducing an oxygen-containing gas or oxygen on the downstream side relative to the travel direction of the substrate in Examples 15 through 20 according to the present invention are excellent in moisture resistance or durability over the vertical magnetic recording media prepared in Comparative Examples 13 through 18 without introducing oxygen on the downstream side relative to the travel direction of the substrate.

floppy disk having a diameter of 5.25 inches, and the disk was contained in a jacket (Example 22).

A lubricating layer of a perfluoroalkyl polyether (having a molecular weight of 6250) having no polar group, which has a thickness of 400 Å, was formed on the magnetic layer of the vertical magnetic recording medium prepared in Example 11 according to the bar coating method. The sample was punched into a floppy disk having a diameter of 5.25 inches, and the disk was contained in a jacket (Comparative Example 19).

Similarly, a lubricating layer of a perfluoroalkyl polyether (having a molecular weight of 4500) having a terminal carboxylic acid group, which had a thickness of 400 Å, was formed on the magnetic layer of the vertical magnetic recording medium prepared in Example 11 according to the bar coating method. The sample was punched into a floppy disk having a diameter of

TABLE 7

| | Evaporated metal | Gas introduced on upstream side | Gas introduced on downstream side | Flow amount ratio of supplied gases | Pressure (Torr) in gas supply chamber | Vertical coercive force (Oe) | Anisotropic magnetic field (kOe) | Moisture resistance | Durafility (Ep30/Ep0) |
|---|---|---|---|---|---|---|---|---|---|
| Example 15 | Co | $N_2$ | $O_2$ | 4/1 | $4.4 \times 10^{-3}$ | 1300 | 5.3 | A | 0.90 |
| Example 16 | Co | Ar | $O_2$ | 7/3 | $6.0 \times 10^{-3}$ | 1080 | 4.8 | A | 0.94 |
| Example 17 | Co | $N_2$ | $45O_2/N_2$ | 1/1 | $3.3 \times 10^{-3}$ | 1300 | 4.6 | A | 0.85 |
| Example 18 | Co | Not introduced | $70O_2/N_2$ | 0/1 | $5.6 \times 10^{-3}$ | 920 | 6.3 | A | 0.88 |
| Example 19 | Fe | $N_2$ | $O_2$ | 4/1 | $3.5 \times 10^{-3}$ | 800 | 2.6 | A | 0.86 |
| Example 20 | Fe | $N_2$ | $45O_2/N_2$ | 1/1 | $5.5 \times 10^{-3}$ | 960 | 3.0 | A | 0.81 |
| Comparative Example 13 | Co | $O_2$ | $N_2$ | 1/4 | $4.4 \times 10^{-3}$ | 1230 | 5.1 | C | 0.80 |
| Comparative Example 14 | Co | $O_2$ | Ar | 3/7 | $9.0 \times 10^{-3}$ | 1000 | 4.6 | C | 0.81 |
| Comparative Example 15 | Co | $45O_2/N_2$ | $N_2$ | 1/1 | $3.3 \times 10^{-3}$ | 1210 | 4.5 | C | 0.70 |
| Comparative Example 16 | Co | $70O_2/N_2$ | Not introduced | 1/0 | $5.6 \times 10^{-3}$ | 890 | 5.7 | C | 0.81 |
| Comparative Example 17 | Fe | $O_2$ | $N_2$ | 1/4 | $3.5 \times 10^{-3}$ | 760 | 2.5 | A | 0.69 |
| Comparative Example 18 | Fe | $45O_2/N_2$ | $N_2$ | 1/1 | $5.5 \times 10^{-3}$ | 840 | 2.8 | B | 0.65 |

EXAMPLES 21 AND 22 AND COMPARATIVE EXAMPLES 19 and 20

The vertical magnetic recording medium having a magnetic layer composed of cobalt and cobalt monoxide, which was prepared in Example 11, was cut into a size of 200 mm×250 mm, and a 0.5% trichlorotrifluoroethylene solution of a perfluoroalkyl polyether (having a molecular weight of 4500) having a terminal carboxylic acid group was coated on the magnetic layer by the bar coating method, and the sample was dried to form a lubricating layer having a thickness of 200 Å. Similarly, another lubricating layer of a perfluoroalkyl polyether (having a molecular weight of 6250) having no polar group, which has a thickness of 200 Å, was prepared on the above lubricating layer. A floppy disk having a diameter of 5.25 inches was cut out from the sample by punching and contained in a jacket (Example 21).

The vertical magnetic recording medium prepared in Example 11 was cut into a size of 200 mm×250 mm. A trichlorotrifluoroethylene solution of a perfluoroalkyl polyether (having a molecular weight of 2500) having a terminal sulfonic acid group was coated on the magnetic layer by the bar coating method to form a lubricating layer having a thickness of 200 Å. Similarly, a lubricating layer of a perfluoroalkyl polyether (having a molecular weight of 3000) having no polar group, which has a thickness of 200 Å, was formed on the above lubricating layer. The sample was punched into a 5.25 inches and the disk was contained in a jacket (Comparative Example 20).

The thus-prepared samples of Examples 21 and 22 and Comparative Examples 19 and 20 were subjected to the life test in the following manner.

By using the floppy disk durability tester (Model SK-429F supplied by Tokyo Engineering K.K.) and the commercially available floppy disk drive (Model JA551 supplied by Matsushita Tsushin Kogyo K.K.), as described above with respect to the durability test, the durability was evaluated. The floppy disk was turned 1,000,000 times at most, and the turning frequency when the reproducing output was reduced below 70% of the initial reproducing output Ep0, that is, the reproducing output ratio was below 0.7, was determined as the life of the sample. The results are shown in Table 8.

TABLE 8

| Sample | Life |
|---|---|
| Example 21 | More than 1,000,000 times |
| Example 22 | More than 1,000,000 times |
| Comparative Example 19 | 100,000 times |
| Comparative Example 20 | 120,000 times |

From the results shown in Table 8, it is seen that if a two-layer structure lubricating layer comprising a perfluoroalkyl polyether or perfluoroalkane having a polar group and a polar group-free perfluoroalkyl polyether or perfluoroalkane is formed on a vertical magnetic recording medium of the present invention, the life of the magnetic layer can be prolonged.

EXAMPLES 23 AND 24

The electron beam vacuum evaporation apparatus shown in FIG. 3 was evacuated so that the pressure in the upper chamber was reduced below $5 \times 10^{-4}$ Torr and the pressure in the vicinity of the substrate in the lower chamber was reduced below $1 \times 10^{-5}$ Torr. A biaxially oriented polyethylene terephthalate film having a thickness of 50 $\mu$m was drawn at a predetermined running speed, and an iron-83% by weight nickel alloy was melted and evaporated by electron beam evaporation and a soft magnetic layer was continuously formed on the film. A shielding plate having such an opening that the incident angle of the vapor stream was smaller than 16° was arranged in the vacuum deposition apparatus. The thus-obtained soft magnetic layer had a thickness of about 3000 Å, the coercive force (HC$\parallel$) in the horizontal direction was 7 Oe, and the saturation magnetization per unit area was 0.023 emu.

A megnetic layer having a magnetic anisotropy in the vertical direction was formed on the thus-formed soft magnetic layer under the same conditions as in Example 8 where the pressure in the vicinity of the substrate was $2 \times 10^{-3}$ Torr, whereby a magnetic recording medium was prepared (Example 23).

A recording magnetic medium was prepared in the same manner as described in Example 23 except that a magnetic layer was directly formed on a biaxially oriented polyethylene terephthalate film having a thickness of 50 $\mu$m (Example 24).

The thus-obtained magnetic layer had a thickness of about 2500 Å, the coercive force (Hc$\perp$) in the vertical direction was 660 Oe, the anisotropic magnetic field (HK) was 3.2 KOe, and the saturation magnetization per unit area was 0.0156 emu.

Recording and reproducing were carried out by using an auxiliary pole energized type single pole head. The main pole used was one prepared by forming a film of cobalt-7.5 atomic % niobium-4.5 atomic % zirconium having a thickness of 1.3 $\mu$m, a width of 200 $\mu$m and a length of 5 mm by sputtering on a silicon wafer substrate having a thickness of 500 $\mu$m and bonding manganese-zinc ferrite of a size of 0.5 mm$\times$0.5 mm$\times$5 mm to the film from a point retreated by 150 $\mu$m from the medium contact top end in longitudinal direction of the film. The auxiliary pole used was one formed by winding an enameled wire by 30 turns around near the medium contact top end of a manganese-zinc ferrite rod.

The magnetic recording medium was punched into a floppy disk shape having a diameter of 5.25 inches and contained in a jacket.

The main pole was brought in contact with the magnetic layer of the medium, and the auxiliary pole was arranged to confront the main pole with the medium being interposed therebetween and the auxiliary pole was separated from the medium by about 100 $\mu$m. The medium was turned at 1800 rpm and a square wave of 2 MHz was recorded. The recording current was selected so that the reproducing output was largest.

In Example 23, a reproducing output of 100 $\mu$Vpp was obtained. In Example 24, the reproducing output was 10 $\mu$Vpp. Accordingly, it was confirmed that if a soft magnetic layer is formed as in Example 23, the reproducing output can be increased.

We claim:

1. A vertical magnetic recording medium comprising a substrate and a magnetic layer formed on the substrate by a reactive vacuum deposition process wherein the vacuum deposition takes place in the presence of a gaseous mixture of oxygen and at least one gas which is chemically inactive in the vacuum deposition system at a pressure of about $1 \times 10^{-3}$ to about $5 \times 10^{-2}$ Torr said mixture comprising 15 to 90% by volume oxygen, said magnetic layer having a magnetic anisotropy in the direction vertical to the surface of the substrate and comprising a metal selected from the group consisting of cobalt and iron and an oxide of said metal, said metal and metal oxide consisting of columnar structures oriented in the direction vertical to the surface of the substrate and spaced from one another through fine voids throughout the magnetic layer, said columnar structures having a diameter of 100 to 1000 Å and the magnetic layer having a void ratio of 7 to 56%.

2. A vertical magnetic recording medium as set forth in claim 1, wherein the magnetic layer has on the surface thereof fine projections having a height of 80 to 500 Å at a density of $1 \times 10^{10}$ to $1 \times 10^{12}$ projections per square centimeter.

3. A vertical magnetic recording medium as set forth in claim 1, which comprises a sft magnetic layer between the substrate and the magnetic layer.

4. A vertical magnetic recording medium as set forth in claim 1, wherein the substrate is composed of a polyester, polyphenylene-sulfide or aromatic polyamide.

5. A vertical magnetic recording medium as set forth in claim 1, wherein the metal is cobalt and the metal oxide is cobalt monoxide (CoO).

6. A vertical magnetic recording medium as set forth in claim 5, wherein the weight ratio of cobalt to cobalt monoxide is in the range of from 80/20 to 20/80.

7. A vertical magnetic recording medium as set forth in claim 1, wherein the metal is iron and the metal oxide is triiron tetraoxide ($Fe_3O_4$).

8. A vertical magnetic recording medium as set forth in claim 7, wherein the ratio of iron to triiron tetraoxide ($Fe_3O_4$) is in the range of from 7/93 to 50/50.

9. A vertical magnetic recording medium as set forth in claim 1, which comprises a lubricating layer having a thickness of 100 to 1000 Å on the magnetic layer.

10. A vertical magnetic recording medium as set forth in claim 9, wherein the lubricating layer is composed of a fluorine-containing organic compound.

11. A vertical magnetic recording medium as set forth in claim 9, wherein the lubricating layer is composed of a perfluoroalkyl polyether or a perfluoroalkane.

12. A vertical magnetic recording medium as set forth in claim 9, wherein the lubricating layer has a layer composed of a perfluoroalkyl polyether having a polar group or a perfluoroalkane having a polar group and a layer composed of a perfluoroalkyl polyether having no polar group or a perfluoroalkane having no polar group.

* * * * *